US010844555B2

(12) United States Patent
Pyle et al.

(10) Patent No.: US 10,844,555 B2
(45) Date of Patent: *Nov. 24, 2020

(54) DRIVE COUPLER FOR DRILL OUTPUT SHAFT

(71) Applicant: Curb Roller LLC, Fairview, KS (US)

(72) Inventors: Kraig Allen Pyle, Hiawatha, KS (US);
Seth Nathaniel Ulmer, Bern, KS (US);
John Allen Armstrong, Fairview, KS (US)

(73) Assignee: Curb Roller LLC, Fairview, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,749

(22) Filed: Sep. 4, 2019

(65) Prior Publication Data

US 2020/0072291 A1    Mar. 5, 2020

Related U.S. Application Data

(60) Provisional application No. 62/726,849, filed on Sep. 4, 2018.

(51) Int. Cl.
*E01C 19/24* (2006.01)
*E04F 21/24* (2006.01)
(Continued)

(52) U.S. Cl.
CPC ............ *E01C 19/24* (2013.01); *E01C 19/201* (2013.01); *E04F 15/14* (2013.01); *E04F 21/248* (2013.01); *F16D 1/076* (2013.01); *F16D 1/0894* (2013.01)

(58) Field of Classification Search
CPC ........ E01C 19/24; E01C 19/201; E04F 15/14; E04F 21/248; F16D 1/076; F16D 1/0894
(Continued)

(56) References Cited

U.S. PATENT DOCUMENTS 827,587 A    7/1906    Warner
1,018,780 A    2/1912    Rauschenbach
(Continued)

OTHER PUBLICATIONS

Milwaukee Tools, Milwaukee M18 Fuel Hole Hawg Quik-Lok (dated Aug. 29, 2014) at https://www.youtube.com/watch?v=7Grfd-uZ25Y.

(Continued)

*Primary Examiner* — Raymond W Addie
(74) *Attorney, Agent, or Firm* — Hovey & Williams LLP

(57) ABSTRACT

A power unit is configured for use as part of a concrete screed and includes a frame, a powered drive, and a drive coupler. The frame includes a drive housing and a handle to be grasped by a user, with the handle being configured to facilitate manual advancement of the concrete screed in the forward direction. The handle and the drive housing are pivotally attached relative to each other so that the handle is swingable relative to the drive housing about a pivot axis that is transverse to the forward direction. The powered drive is operably supported by the drive housing and includes a rotatable drive shaft. The drive coupler is attached to the drive shaft and is removably attachable to the connection shaft of a rotatable concrete forming drum so that rotation of the drive shaft is imparted to the connection shaft. The drive coupler is configured to align the drive and connection shafts on a common rotation axis without permitting off-axis swinging of the shafts relative to one another, such that swinging of the drive housing relative to the drum is at least substantially restricted.

20 Claims, 25 Drawing Sheets

(51) Int. Cl.
*E01C 19/20* (2006.01)
*E04F 15/14* (2006.01)
*F16D 1/076* (2006.01)
*F16D 1/08* (2006.01)

(58) Field of Classification Search
USPC .......................................................... 404/103
See application file for complete search history.

(56) References Cited

U.S. PATENT DOCUMENTS

| | | | |
|---|---|---|---|
| 2,831,408 A | 4/1958 | Konway | |
| 2,962,948 A | 12/1960 | Tout et al. | |
| 3,532,032 A | 10/1970 | Weber et al. | |
| 3,553,506 A | 1/1971 | Fresard | |
| 3,605,577 A | 9/1971 | Bik | |
| 3,705,638 A | 12/1972 | Shock | |
| 3,796,505 A | 3/1974 | Buhler | |
| 3,910,738 A | 10/1975 | Chandler et al. | |
| 4,131,162 A | 12/1978 | Schmitz | |
| 4,142,815 A | 3/1979 | Mitchell | |
| 4,169,305 A | 10/1979 | Kruszona | |
| 4,208,151 A | 6/1980 | Cross | |
| 4,438,819 A | 3/1984 | Ryals | |
| 4,702,640 A | 10/1987 | Allen | |
| 5,018,955 A | 5/1991 | Parrish et al. | |
| 5,062,737 A | 11/1991 | Samuels | |
| 5,372,452 A * | 12/1994 | Hodgson | E04F 21/248 404/112 |
| 5,468,095 A | 11/1995 | Dawson | |
| 5,480,259 A | 1/1996 | Thrower | |
| 5,527,129 A | 6/1996 | McKinnon | |
| 5,803,656 A | 9/1998 | Turck | |
| 5,899,285 A | 5/1999 | Curbelo | |
| 6,049,970 A | 4/2000 | Reis et al. | |
| 6,302,620 B1 | 10/2001 | Matsuji et al. | |
| D459,175 S | 6/2002 | Monteil | |
| 6,402,425 B1 | 6/2002 | Paladeni | |
| 6,474,906 B1 | 11/2002 | Cunningham et al. | |
| 6,502,313 B1 | 1/2003 | Bilodeau | |
| 6,863,470 B2 | 3/2005 | Eggleton et al. | |
| 6,941,632 B1 | 9/2005 | Mead et al. | |
| D512,568 S | 12/2005 | Cho | |
| 7,175,365 B1 * | 2/2007 | Breeding | E01C 19/402 404/113 |
| 7,621,694 B1 | 11/2009 | Goodman et al. | |
| 8,297,878 B2 | 10/2012 | Goodman et al. | |
| 9,879,389 B1 | 1/2018 | Lura | |
| 2010/0239368 A1 | 9/2010 | Lickel | |
| 2011/0188930 A1 | 8/2011 | Lura | |
| 2012/0045282 A1 * | 2/2012 | Lura | E01C 19/24 404/118 |
| 2020/0190834 A1 * | 6/2020 | Cowie | E01C 19/24 |

OTHER PUBLICATIONS

International Search Report and Written Opinion from PCT/US2019/049573 entitled: Powered Concrete Screed (dated Jan. 10, 2020).
Office Action From U.S. Appl. No. 16/560,689 (dated Jul. 6, 2020).

\* cited by examiner

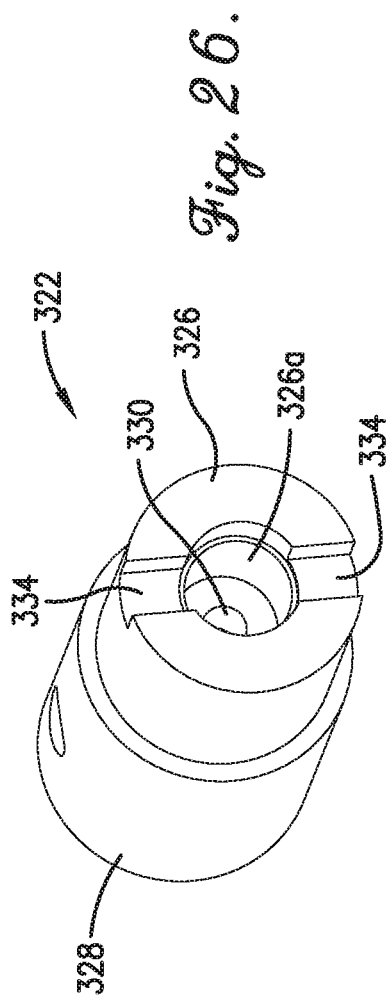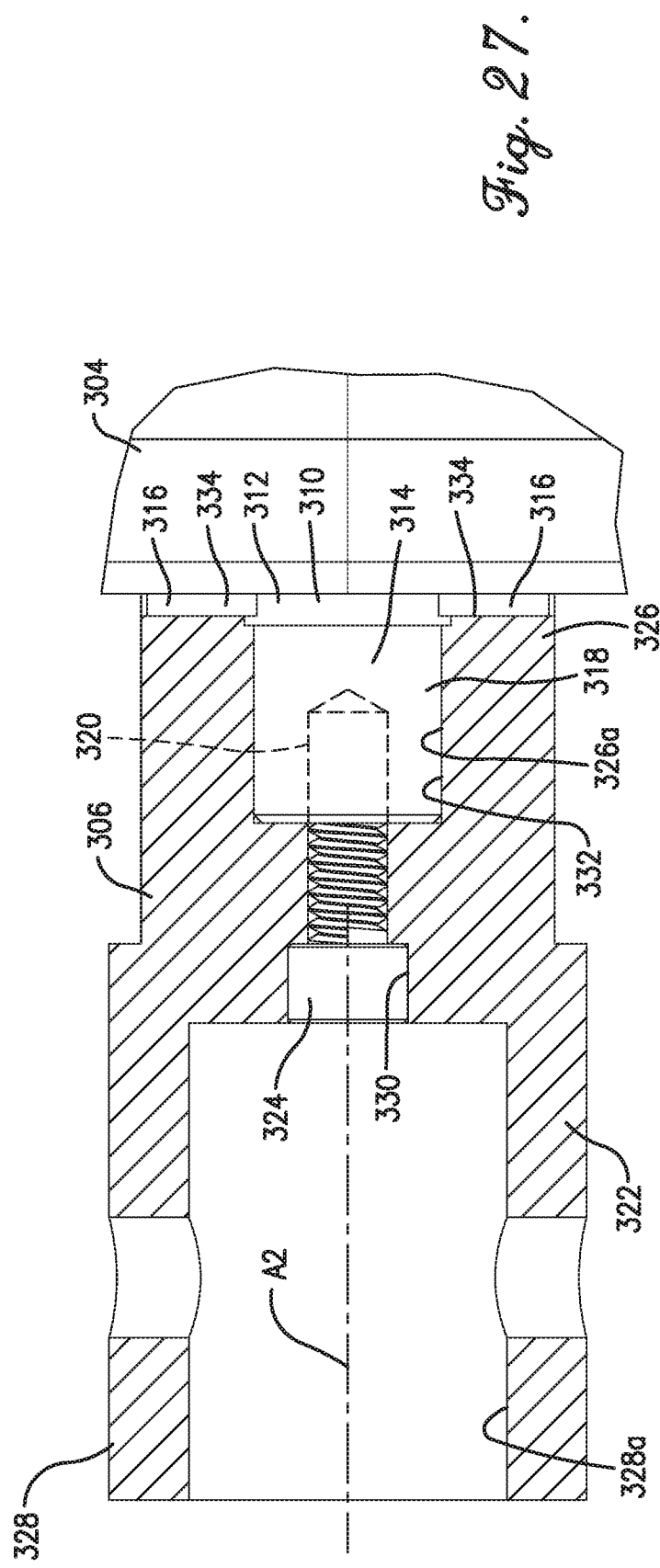

US 10,844,555 B2

DRIVE COUPLER FOR DRILL OUTPUT SHAFT

CROSS-REFERENCE TO RELATED APPLICATIONS

This application claims the benefit of U.S. Provisional Application Ser. No. 62/726,849, filed Sep. 4, 2018, entitled BATTERY POWERED CONCRETE SCREED, which is hereby incorporated in its entirety by reference herein.

This application is being filed contemporaneously with U.S. Nonprovisional application Ser. No. 16/560,689 entitled CORDLESS ELECTRICALLY-POWERED CONCRETE SCREED, and U.S. Nonprovisional application Ser. No. 16/560,741 entitled CONCRETE SCREED POWER CONTROL LINKAGE, each of which is hereby incorporated in its entirety by reference herein.

BACKGROUND

1. Field

The present invention relates generally to power tools and related equipment. In particular, embodiments of the present invention concern a power unit used as part of a concrete screed and including a drive coupler to align and connect a drive shaft of the power unit and a connection shaft of a rotating concrete forming drum (although other drive connections are contemplated).

2. Discussion of Prior Art

Various types of concrete structures, such as slabs, walkways, and walls, are conventionally graded, formed, and/or finished to present an exposed surface with a desired grade and surface texture. In the usual manner, forms are erected to define boundaries of the concrete structure and may serve as a guide for grading, forming, and/or finishing the exposed surface.

Powered concrete forming tools have long been available to form, float, or trowel a poured concrete area. Conventional powered forming tools are known to receive power from different types of power sources, such as an internal combustion engine, a hydraulic power source, or a corded electric power source.

However, prior art concrete forming tools have certain deficiencies. Powered concrete forming tools are well known as being bulky and heavy, such that the tool is difficult to transport and operate in a precise manner. For instance, powered screeds generally require more than one operator to advance the screed and are difficult to manipulate. Known powered screeds include a pair of screed handles that are cooperatively used to advance the screed. The handles are attached to ends of a rotatable drum and are shiftable laterally so that operators can hold the handles while walking alongside concrete forms. However, lateral shifting of the handles can cause difficulties with screed manipulation and increases the likelihood of damaging the screed. In particular, shifting of the handle associated with the drive mechanism can apply undue forces to the connection between the drive mechanism and the drum and cause premature wear and damage.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide a power unit for a concrete screed that does not suffer from the problems and limitations associated with prior art devices, including those problems set forth above.

An aspect of the present invention concerns a power unit for a concrete screed, wherein the screed includes a rotatable concrete forming drum with a connection shaft, and the screed is configured to be manually advanced in a forward direction. The power unit broadly includes a frame, a powered drive, and a drive coupler. The frame includes a drive housing and a handle to be grasped by a user, with the handle being configured to facilitate manual advancement of the concrete screed in the forward direction. The handle and the drive housing are pivotally attached relative to each other so that the handle is swingable relative to the drive housing about a pivot axis that is transverse to the forward direction. The powered drive is operably supported by the drive housing and includes a rotatable drive shaft. The drive coupler is attached to the drive shaft and is removably attachable to the connection shaft of the drum so that rotation of the drive shaft is imparted to the connection shaft. The drive coupler is configured to align the drive and connection shafts on a common rotation axis without permitting off-axis swinging of the shafts relative to one another, such that swinging of the drive housing relative to the drum is at least substantially restricted.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 15:
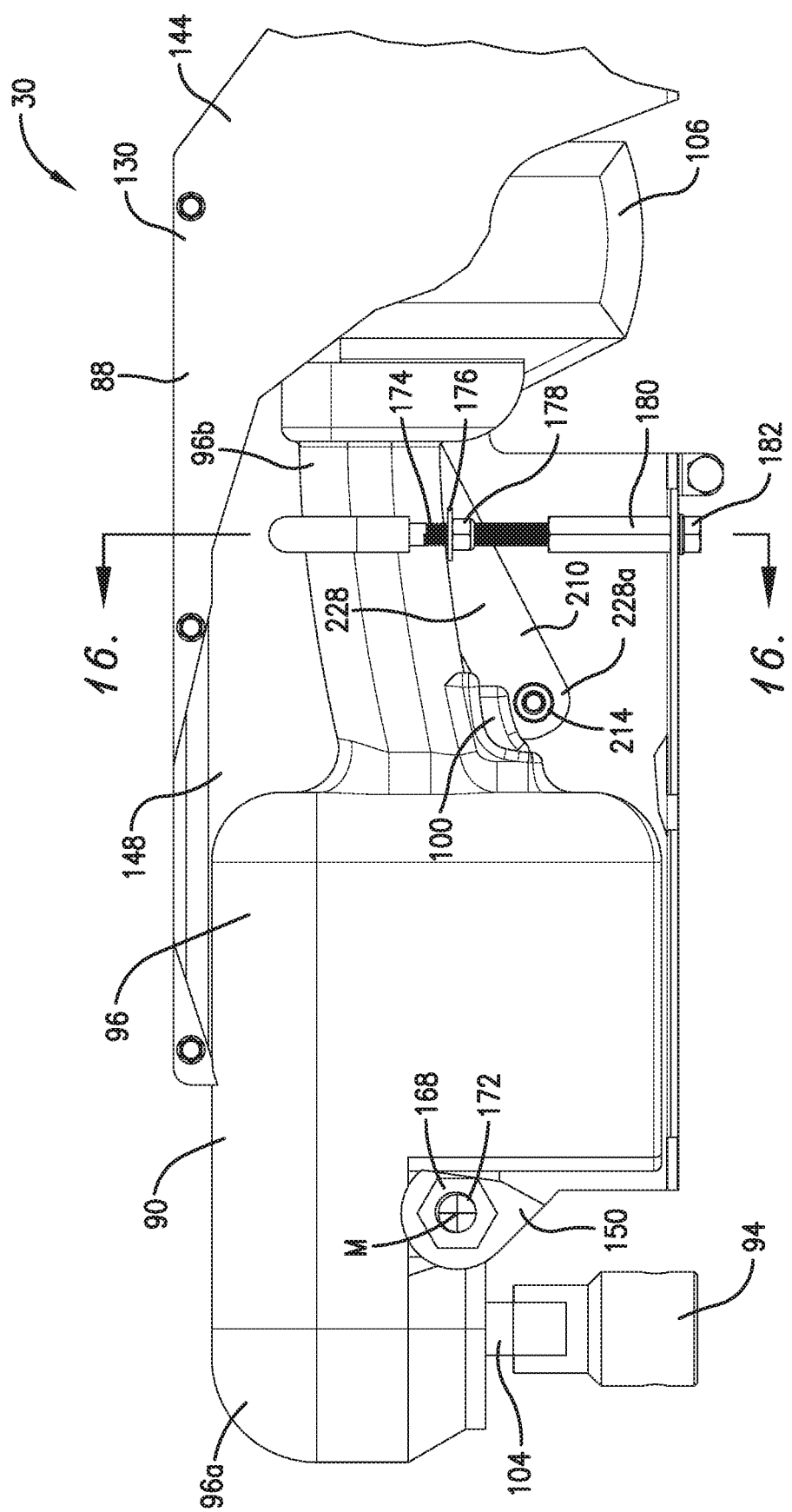
Figure 16:
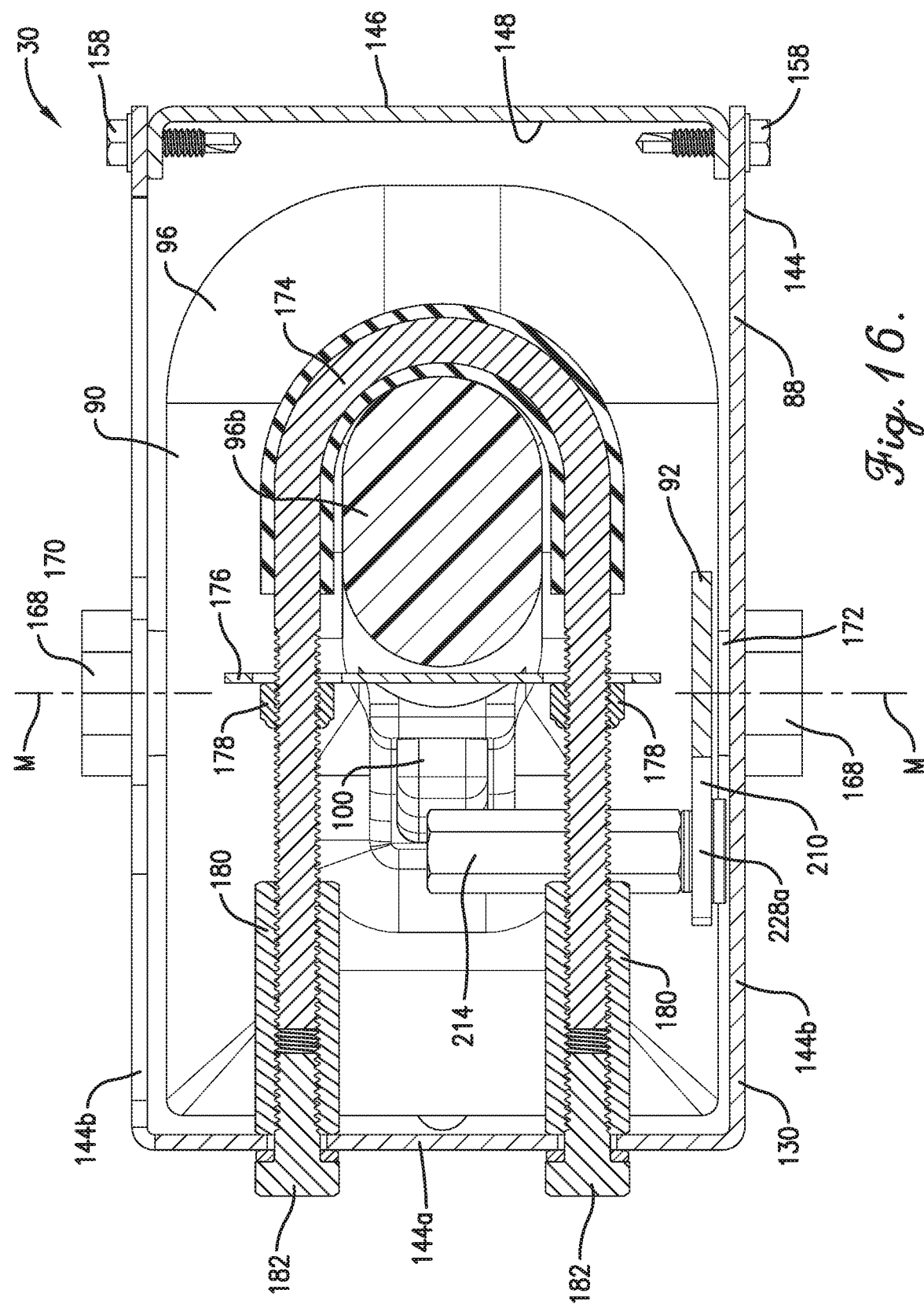
Figure 17:
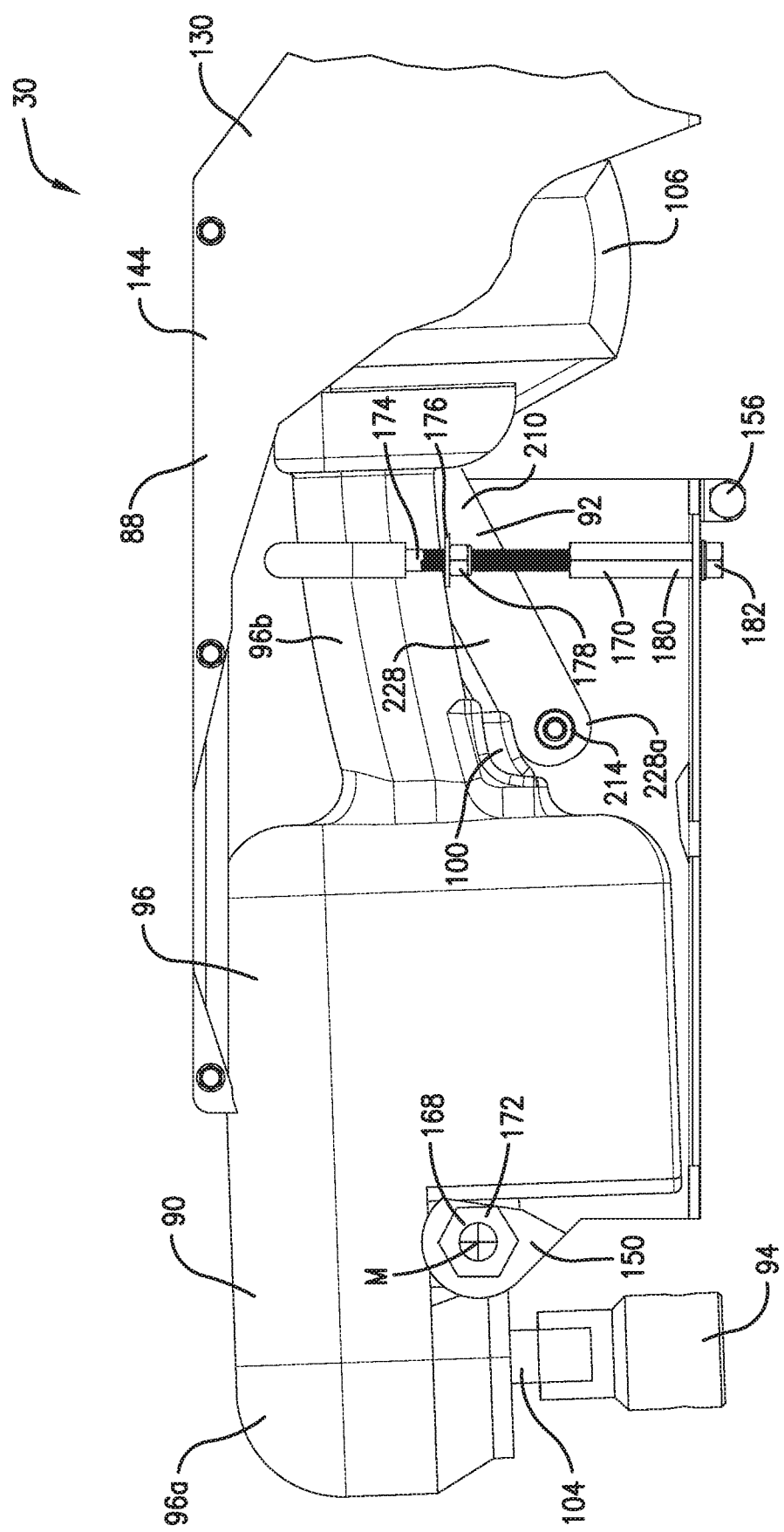
Figure 18:
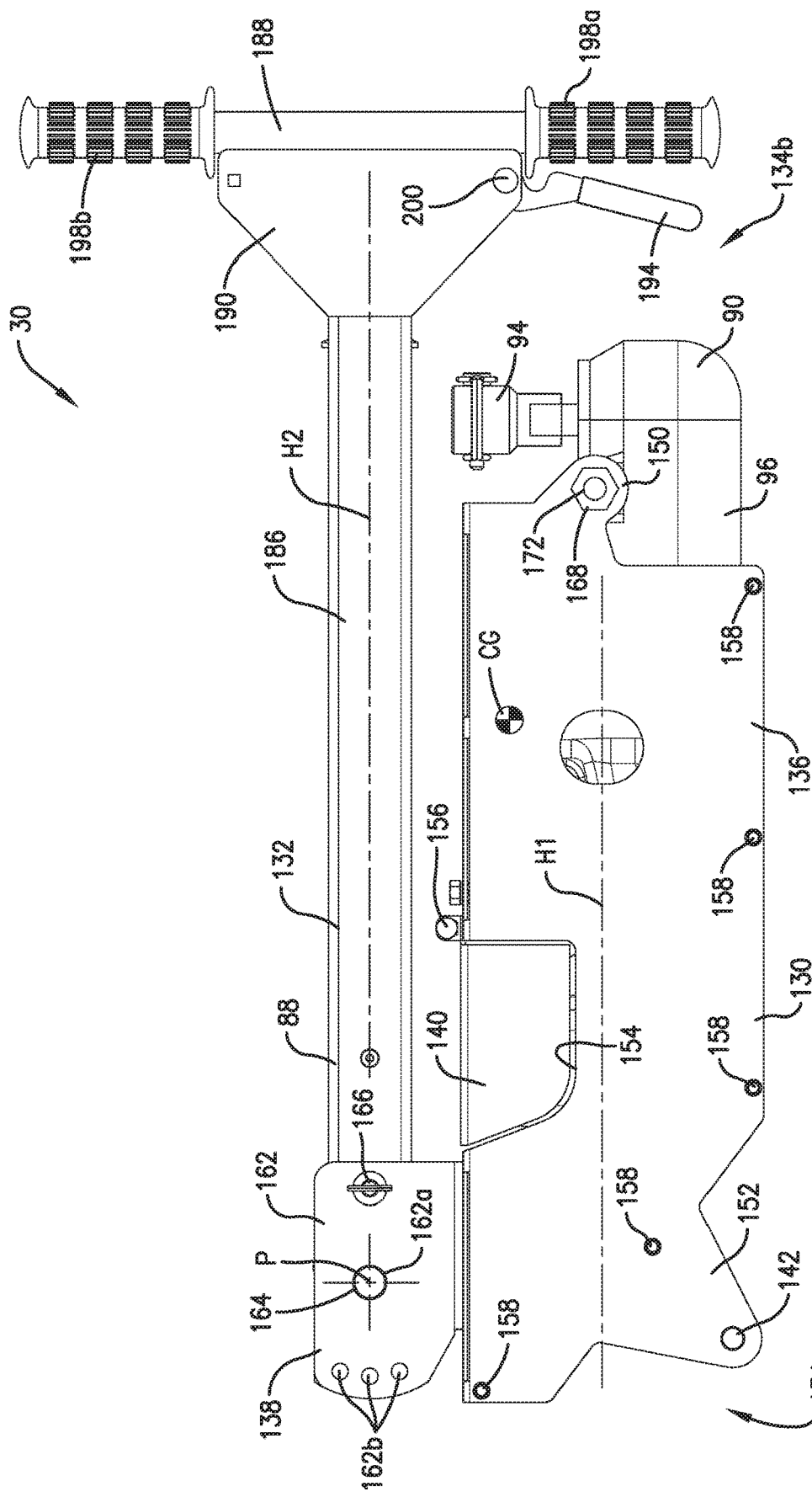
Figure 19:
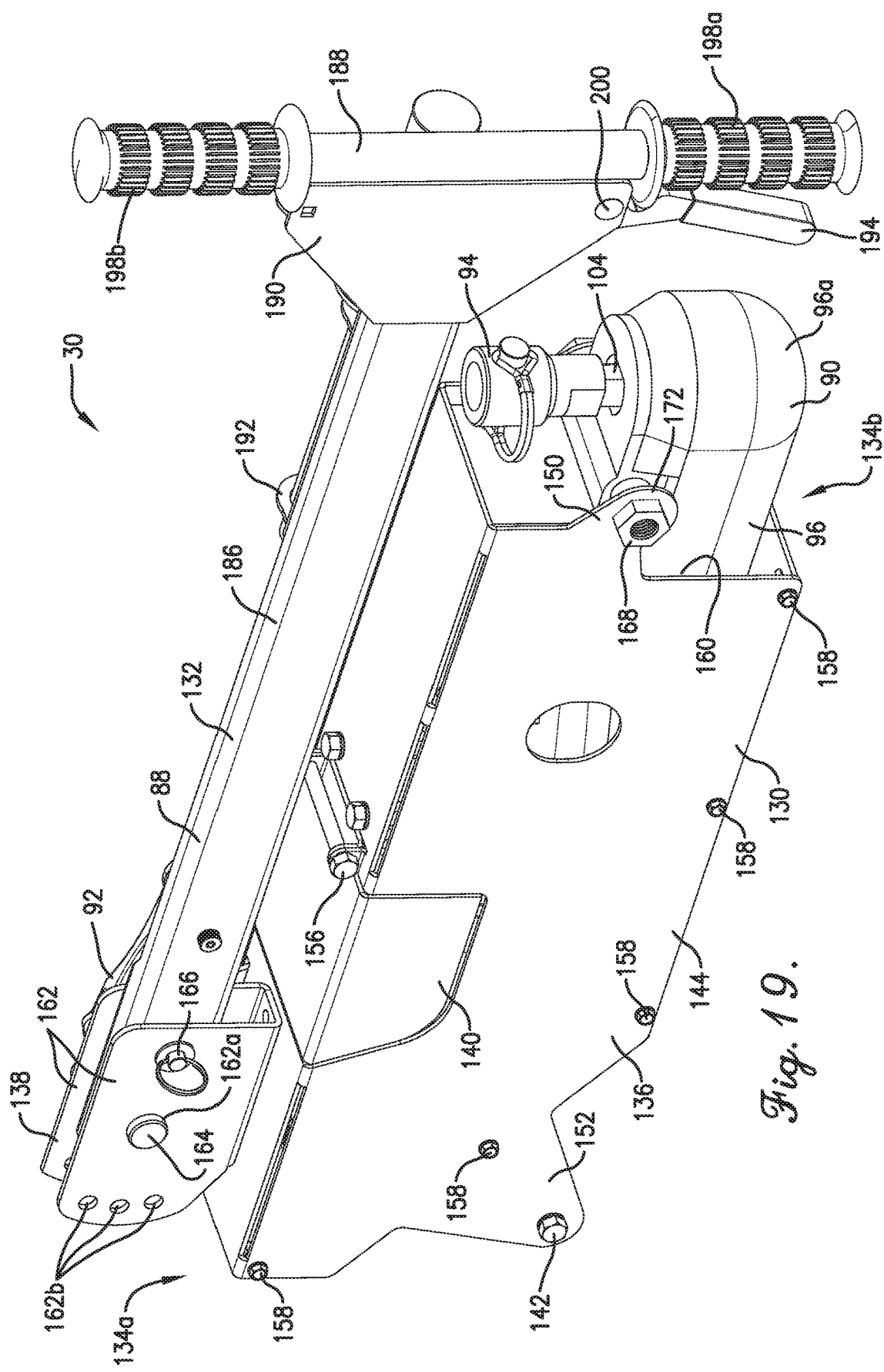
Figure 20:
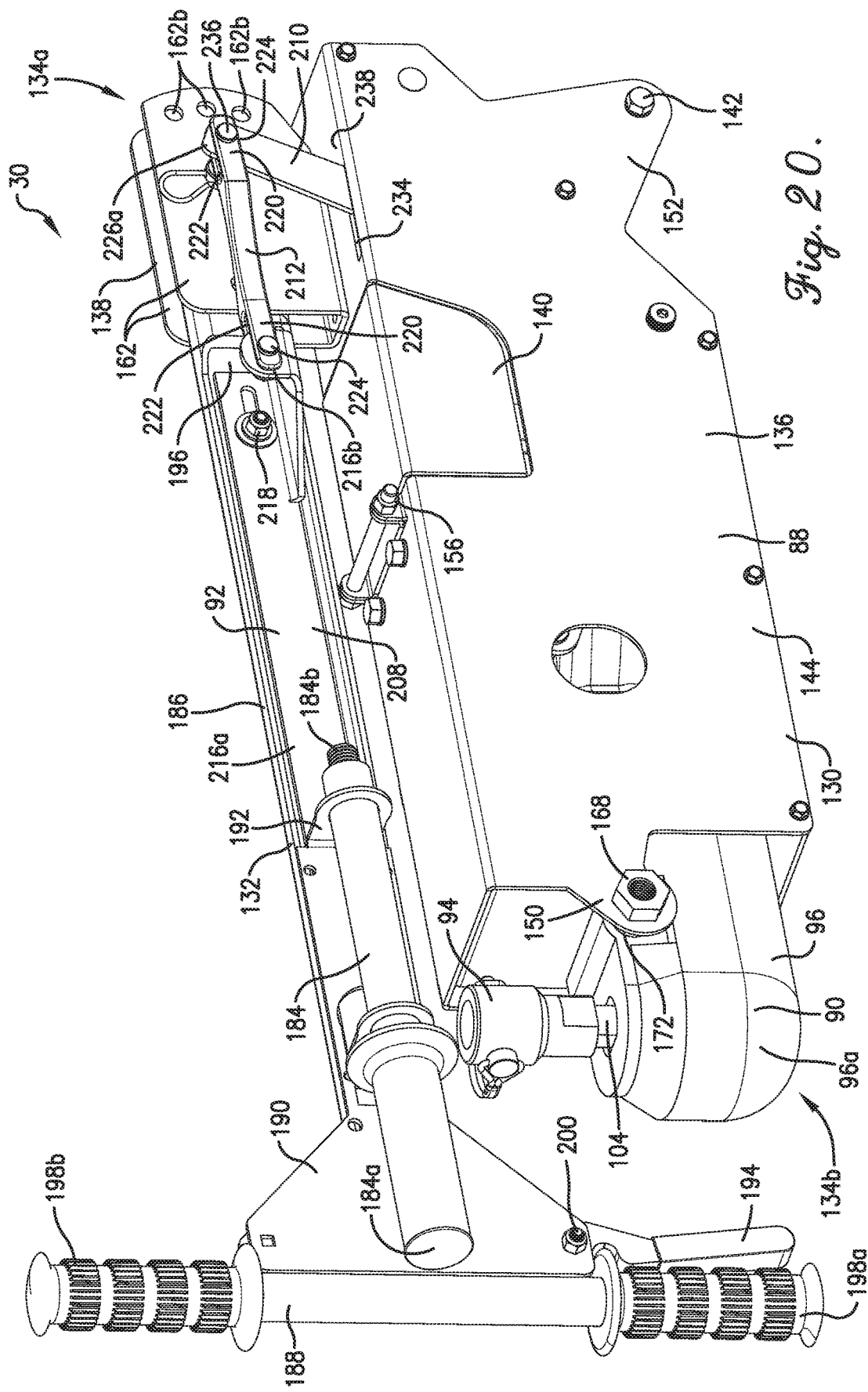
Figure 21:
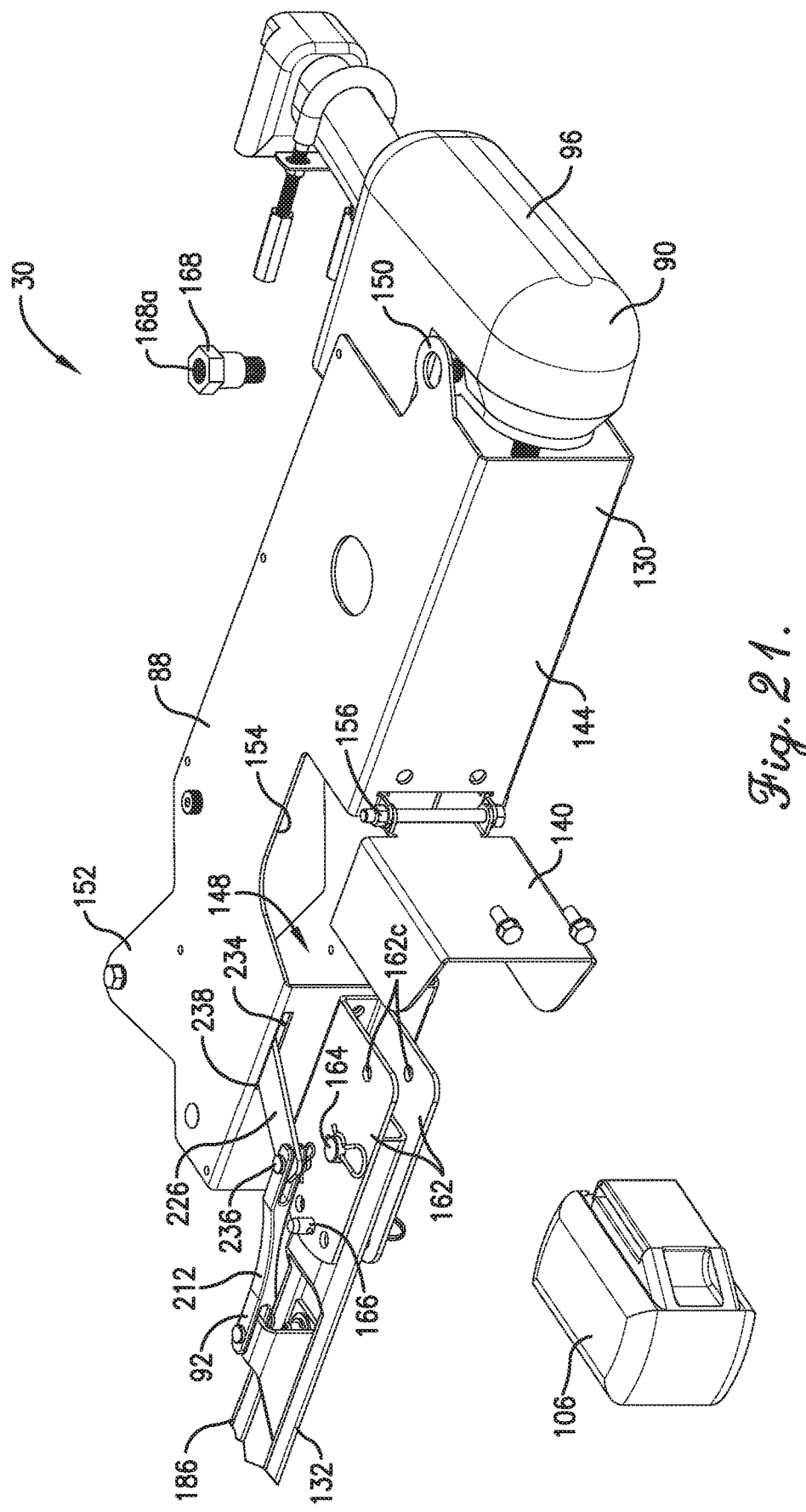
Figure 22:
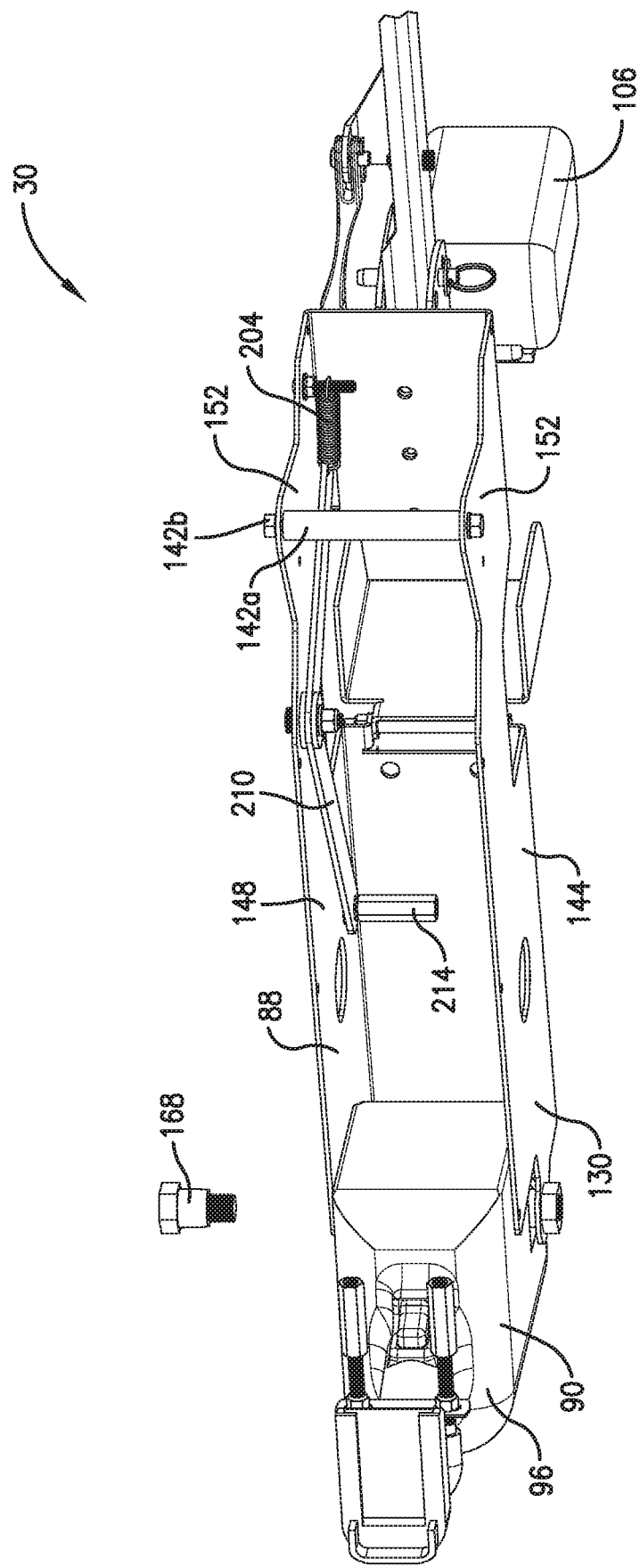
Figure 23:
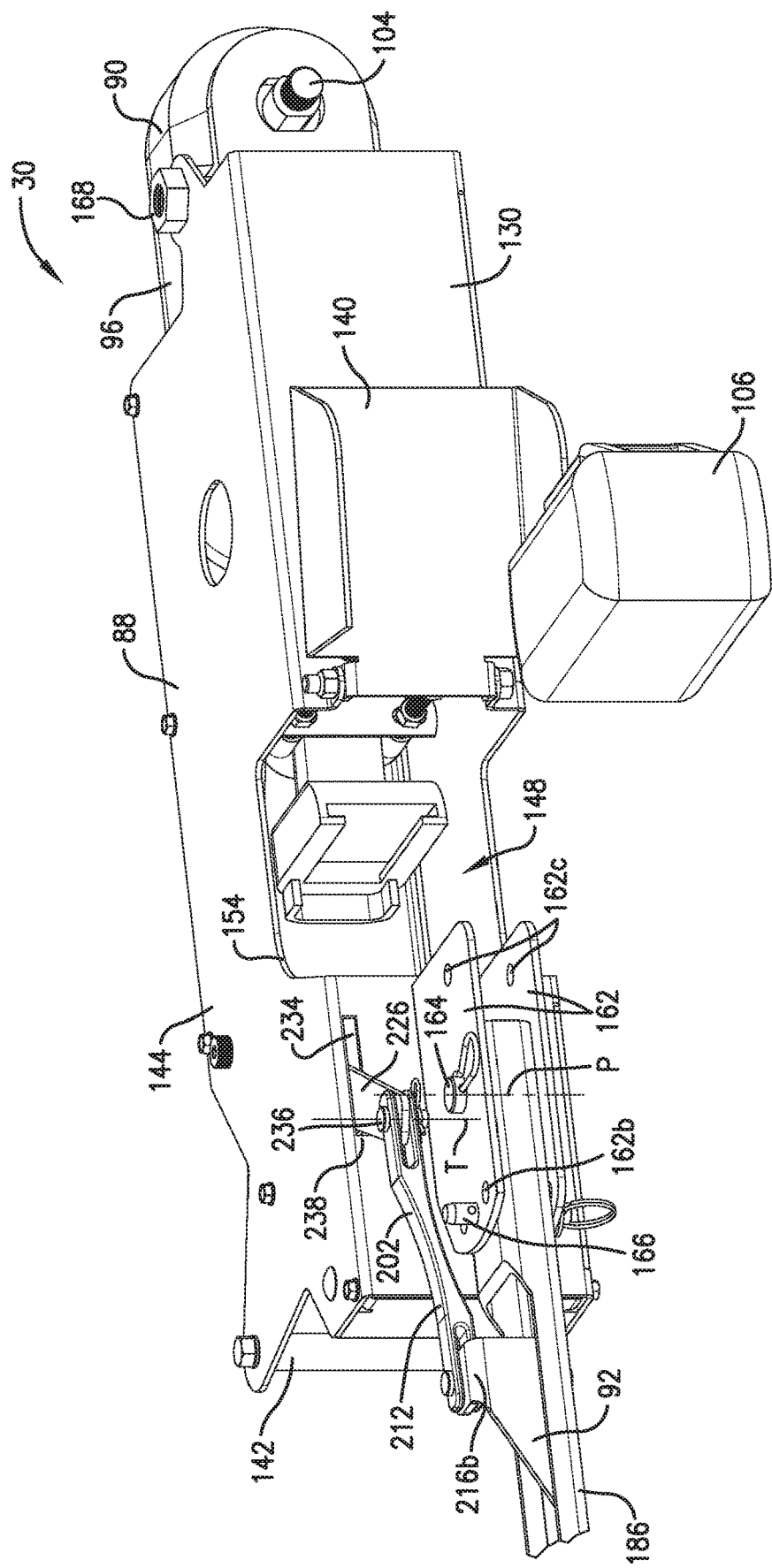
Figure 24:
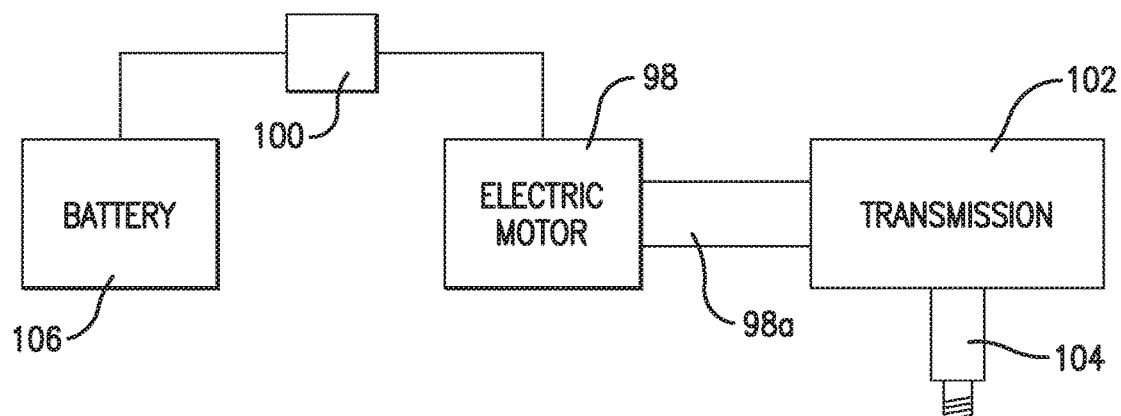
Figure 25:
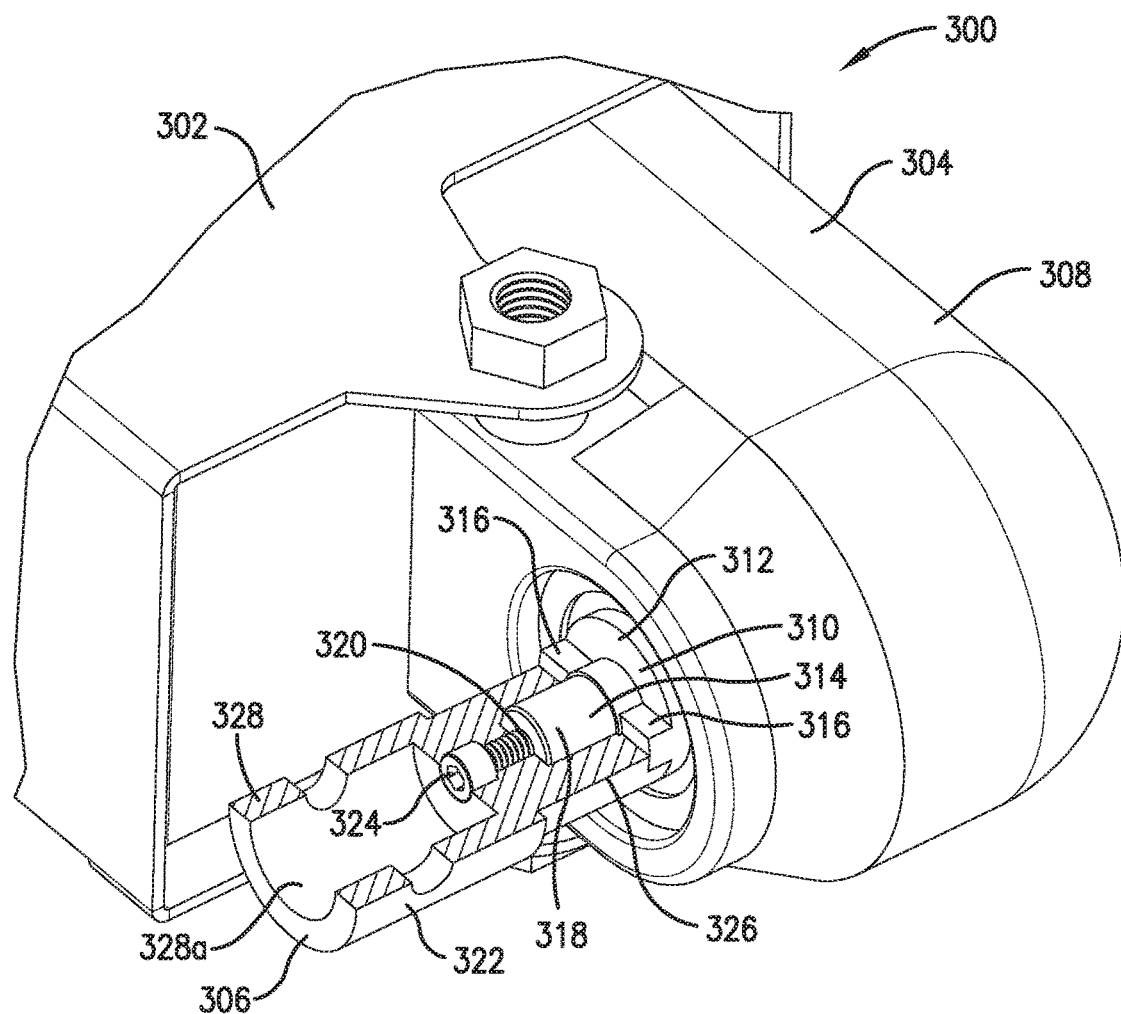

FIG. 15 is an enlarged fragmentary elevation of the power unit shown in FIGS. 1-6 and 8-14, depicting part of the drive housing broken away to depict the powered drive located within the drive housing, with the powered drive being mounted to the drive housing in an operating location by support fasteners and a drive adjustment device, and with the drive adjustment device being adjusted to locate the contact arm of the linkage in engagement with the drive control element of the powered drive;

FIG. 16 is a cross section of the power unit taken along line 16-16 in FIG. 15, with the drive adjustment device including a U-bolt, a plate, threaded nuts; threaded sleeves, and threaded bolts;

FIG. 17 is an enlarged fragmentary elevation of the power unit similar to FIG. 15, but showing the powered drive installed in an initial location offset from the operating location, with the drive adjustment device being operable to move the powered drive from the initial location to the operating location;

FIG. 18 is an elevation of the power unit shown in FIGS. 1-6 and 8-17, depicting the power unit handle swung to a transport position;

FIG. 19 is a perspective of the power unit as depicted in FIG. 18;

FIG. 20 is a perspective of the power unit similar to FIG. 19, but taken from the opposite side;

FIG. 21 is a fragmentary perspective of the power unit shown in FIGS. 1-20, with a cover of the drive housing removed and an access door opened, and with the powered drive detached from the drive housing and a battery removed from the powered drive;

FIG. 22 is a fragmentary perspective of the power unit similar to FIG. 21, but taken from the opposite side to depict the interior of the drive housing;

FIG. 23 is a fragmentary perspective of the power unit similar to FIG. 21, but showing the powered drive mounted within the drive housing and located to receive the battery;

FIG. 24 is a fragmentary schematic view of the powered drive shown in FIGS. 13-23, depicting the battery, the drive control element, an electric motor, and a transmission of the powered drive;

FIG. 25 is a fragmentary perspective of a power unit constructed in accordance with a second preferred embodiment of the present invention, depicting a drive housing, an alternative powered drive, and an alternative coupler, with the coupler including a coupler body and a fastener;

FIG. 26 is a perspective of the coupler body shown in FIG. 25; and

FIG. 27 is a fragmentary elevation of the power unit shown in FIG. 25, showing the coupler body cross-sectioned.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Turning to FIGS. 1-5, a power unit 30 is provided as part of a powered concrete screed 32. The concrete screed 32 is configured to be manually advanced in a forward direction D along poured concrete C (see FIGS. 1 and 2). Concrete forms F are constructed to define a space to receive the poured concrete C. The concrete forms F hold the poured concrete C within the space as the concrete is graded and finished to form a concrete slab B with a formed surface S.

In the usual manner, the concrete screed 32 is pulled forwardly across the concrete area to screed the poured concrete C and grade the formed surface S. As the concrete screed 32 is advanced forwardly to grade the surface 5, a rotatable concrete forming drum 34 rotates in rotation direction R so that excess concrete along the drum 34 is directed forwardly ahead of the drum 34 (see FIGS. 1 and 2).

During operation, it will be understood that the concrete screed 32 can be used to remove excess concrete material. For example, the concrete screed 32 can remove excess concrete from an area where the poured concrete C is above a desired grade level. In the depicted embodiment, the desired grade level is defined by an upper edge of the forms F. Preferably, the drum 34 rests on the upper edge of the forms F during screed advancement to grade the formed surface S at the desired grade level.

The concrete screed 32 can also be used to transfer concrete from one area for use in another area. For instance, the concrete screed 32 can transfer excess concrete to an area where the poured concrete C is below the desired grade level.

The formed surface S of the depicted concrete slab B is generally flat (i.e., planar) and level relative to a horizontal plane. It will also be appreciated that the concrete screed 32 can be used to grade the surface of a concrete slab so that the surface is flat (i.e., planar) and sloped relative to the horizontal plane. For instance, one of the concrete forms F could be positioned higher than the other concrete form F.

For certain aspects of the present invention, the concrete screed could be configured to form a graded surface that is not flat. For instance, the formed surface could be shaped to include a convex shape and/or a concave shape. In alternative embodiments, the formed surface may be shaped so that the graded concrete forms at least part of another type of concrete structure (e.g., a walkway, wall, drainage ditch, or curbing).

The concrete screed 32 broadly includes the power unit 30, the rotatable concrete forming drum 34, and a screed handle 36.

Rotatable Concrete Forming Drum

Figure 5:
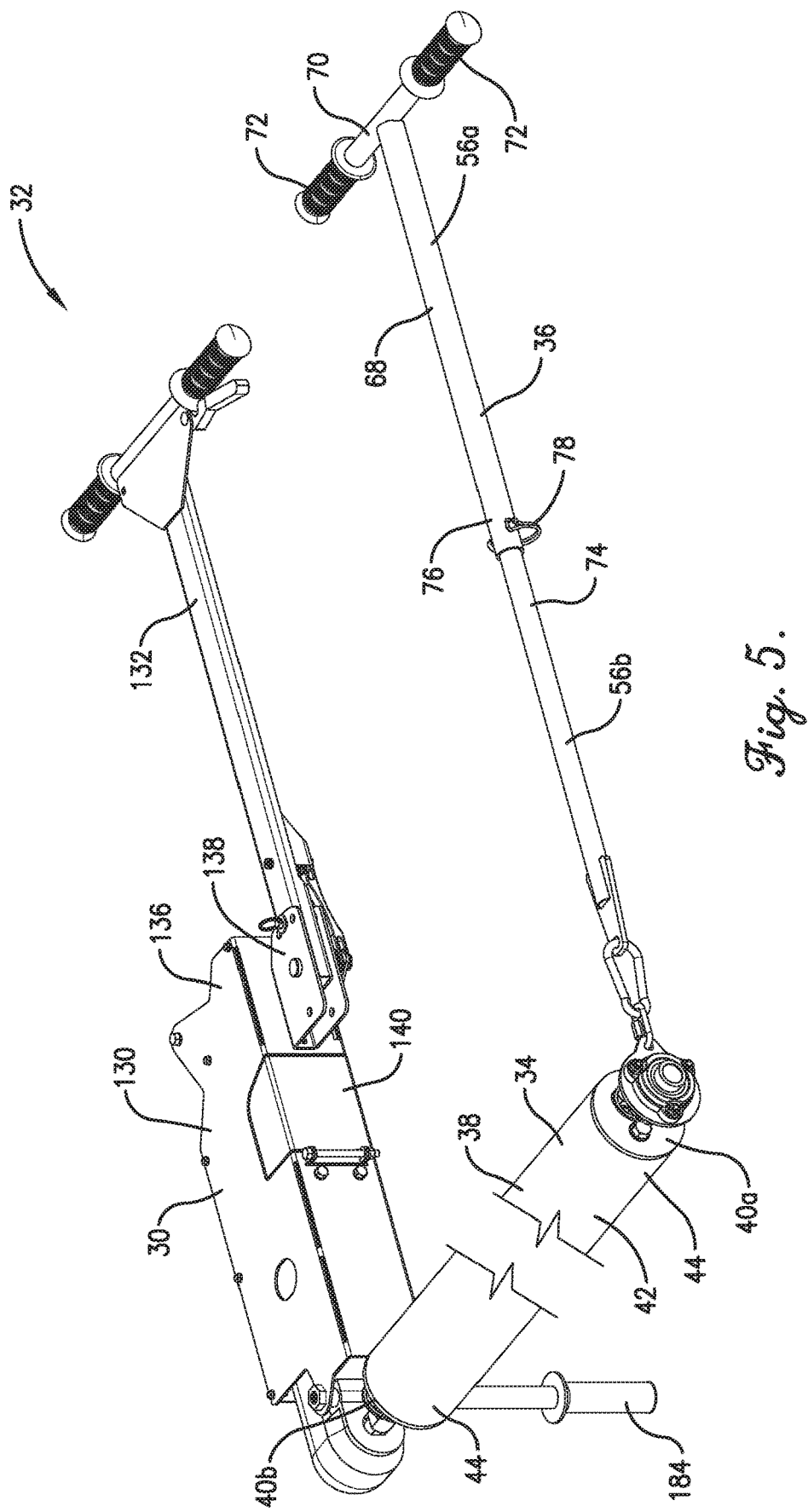
FIG. 5 is a fragmentary perspective of the concrete screed similar to FIG. 4, but taken from the opposite side.
Figure 6:
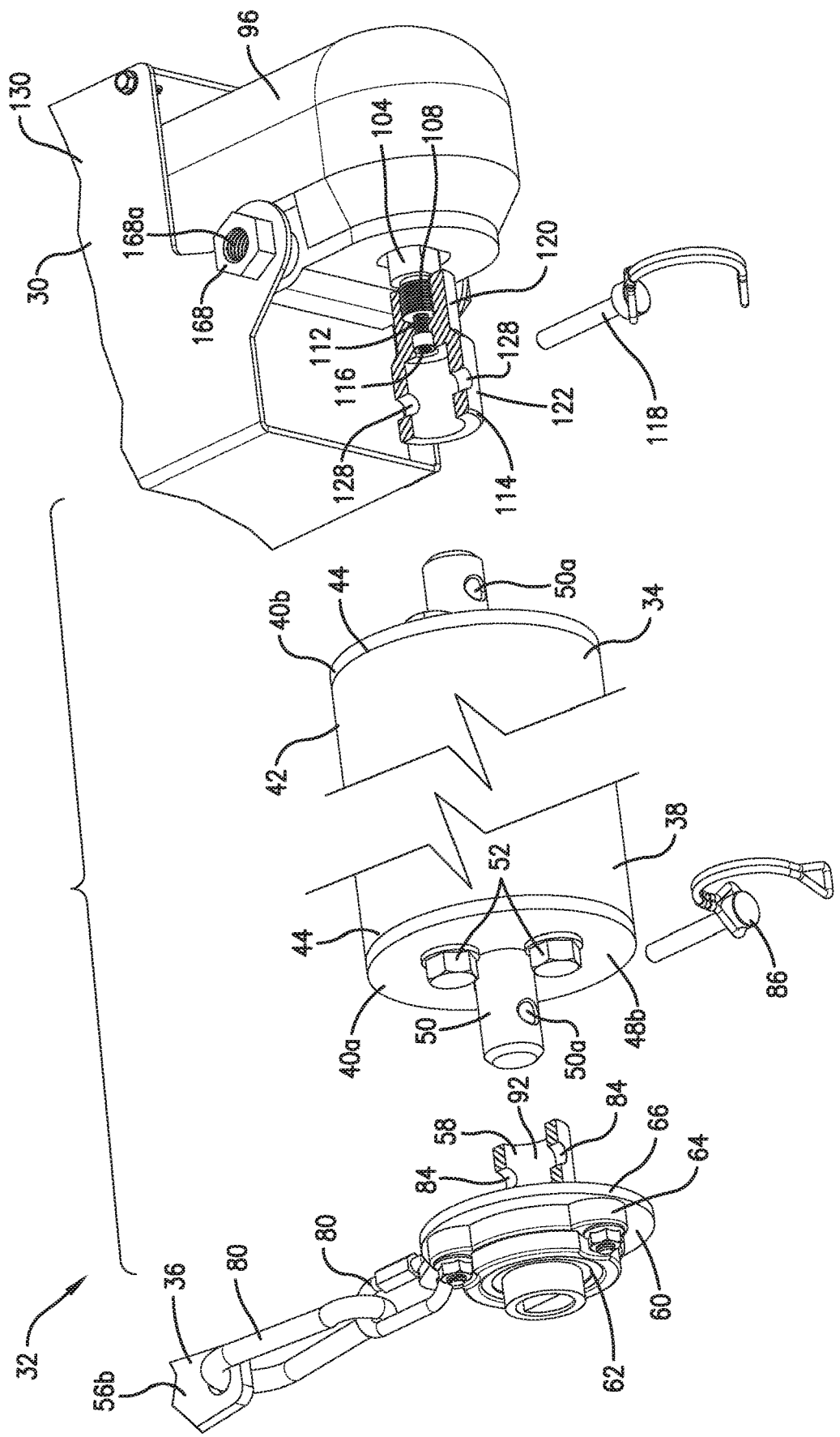
FIG. 6 is a fragmentary perspective of the concrete screed shown in FIGS. 1-5, showing the power unit and screed handle exploded away from the respective drum ends of the drum.
Figure 7:
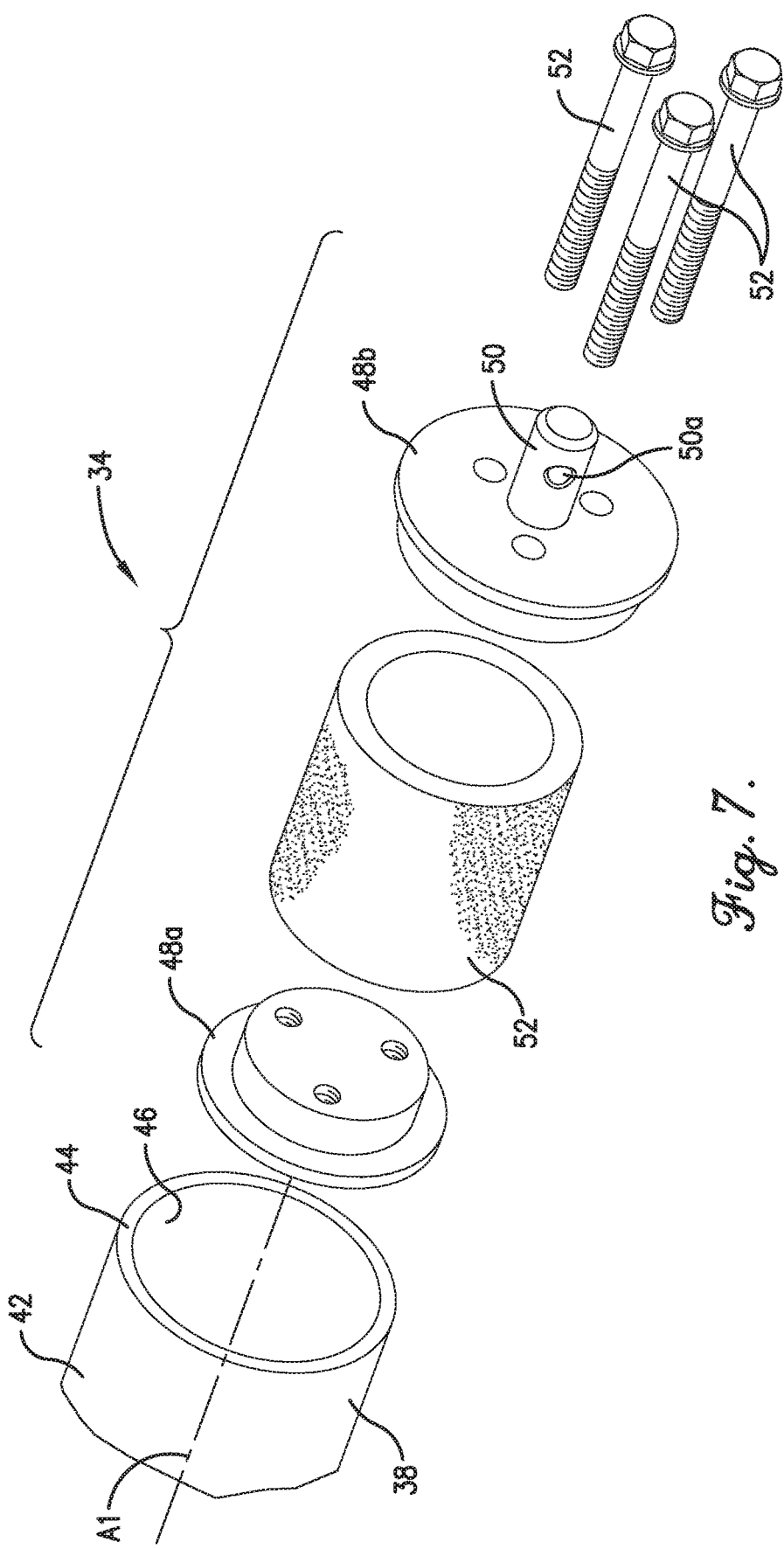
FIG. 7 is a fragmentary perspective of the drum shown in FIGS. 1-6, showing a tubular drum body and one of the drum ends, with the drum end including inboard and outboard flanges, a connection shaft, an elastic sleeve, and fasteners.

Turning to FIGS. 5-7, the drum 34 is operable to be rotated by the power unit 30. As will be explained, the drum 34 is rotatable to engage concrete along the length of the drum 34 and direct at least some concrete forwardly ahead of the drum 34. The drum 34 preferably includes a drum body 38 and drum ends 40a,b.

The drum body 38 is operable to engage the poured concrete C to form the graded surface S. The depicted drum body 38 preferably comprises a unitary cylindrical tube that presents an outer cylindrical surface 42 and opposite cylinder ends 44. In the usual manner, the cylindrical surface 42 comprises a surface of revolution about a drum axis A1 (see FIG. 7). The drum body 38 also presents a continuous tube bore 46 extending between the cylinder ends 44.

The drum body 38 is preferably formed of an aluminum tube material having a substantially constant cross section along the length of the drum. It will be understood that the use of a tubing permits the drum body 38 to be readily customized to a desired drum length. In many, applications, the drum body 38 can be formed by cutting a length of stock tube to the desired drum length. For some aspects of the present invention, the drum body could also be formed by fixing multiple tube pieces together.

Although the drum body 38 is preferably comprised of aluminum, it is also within the scope of the present invention for the drum body to include, additionally or alternatively, another metallic material (e.g., carbon steel or stainless steel) or a synthetic resin material.

In alternative embodiments, the surface 42 could be formed to present an alternative surface of revolution about the drum axis A1. For instance, the drum surface could include a frustoconical surface, formed by revolving a straight line about the drum axis, where the straight line extends at an oblique angle to the drum axis. The drum surface could also include a surface formed by revolving a plane curve about the drum axis so that the surface includes a concave and/or convex section.

The drum body 38 is cooperatively supported by the drum ends 40a,b. As will be shown, the drum body 38 is also preferably rotatably driven by the drum end 40b. Each drum end 40a,b preferably includes inboard and outboard flanges 48a,b, a connection shaft 50, an elastic sleeve 52, and fasteners 54. Each connection shaft 50 presents a transverse hole 50a and is fixed to a respective outboard flange 48a,b The fasteners 54 are slidably received by holes in the outboard flanges 48b and extend through the sleeve 52. The fasteners 54 are also threaded into threaded holes of the inboard flanges 48a to secure the sleeve 52 between the flanges 48a,b. The fasteners 54 can be threaded into and out of the inboard flanges 48a to move the flanges 48a,b toward and away from each other. For instance, when the flanges 48a,b are engaged with respective ends of the sleeve 52, the flanges 48a,b can be drawn toward each other to compress the sleeve 52 axially. Axial compression of the sleeve 52 causes the sleeve 52 to expand radially so that the sleeve diameter increases.

Similarly, when the sleeve 52 is axially compressed and radially expanded, the fasteners 54 can be adjusted to move the flanges 48a,b away from each other. As the flanges 48a,b move away from each other, the compressed sleeve 52 is allowed to resiliently expand in the axial direction. Axial expansion of the sleeve 52 causes the sleeve 52 to contract radially so that the sleeve diameter decreases.

The illustrated drum 34 can be selectively assembled by engaging the drum ends 40a,b within respective cylinder ends 44 of the drum body 38. More specifically, the flanges 48a,b of each drum end 40a,b are positioned so that the sleeve diameter is sized to permit insertion and removal of the sleeve 52 relative to the cylinder end 44. Preferably, the sleeve diameter is less than the tube bore diameter of the cylinder end 44 when inserting or removing the drum end 40a,b. For some aspects of the present invention, it may be feasible to insert and/or remove the drum end 40a,b when the sleeve 52 is partly expanded (e.g., where the sleeve diameter is the same or slightly larger than the tube bore diameter).

Once located within the cylinder end 44, the fasteners 54 of the drum end 40a,b are preferably adjusted to frictionally secure the drum end 40a,b within the cylinder end 44. In the depicted embodiment, the fasteners 54 are adjusted to move the flanges 48a,b toward each other so that the sleeve 52 is axially compressed and radially expanded into engagement with the tube bore 46. Further axial compression of the sleeve 52 by the flanges 48a,b causes the sleeve 52 to become radially compressed while remaining in conforming contact with the tube bore 46.

The drum ends 40a,b can be selectively disengaged from the respective cylinder ends 44. Preferably, the fasteners 54 are adjusted to move the flanges 48a,b away from each other so that the sleeve 52 axially expands and radially contracts.

It is also within the ambit of the present invention for one or both of the drum ends to be alternatively attached to the drum body. As will be shown, the drum ends are configured to cooperatively position the drum during operation and transport.

Screed Handle

Turning again to FIGS. 1-5, the screed handle 36 is configured to position the drum 34 by moving the drum end 40a, The handle 36 includes telescopic proximal and distal handle sections 56a,b, a coupler shaft 58, bearing housing 60, and a bearing 62 that rotatably supports the coupler shaft 58 relative to the bearing housing 60.

The housing 60 includes a pair of plates 64 and fasteners 66 (see FIG. 6). The plates 64 cooperatively receive the bearing 62 and the coupler shaft 58 and are removably secured to each other by the fasteners 64. Preferably, the coupler shaft 58 can spin freely relative to the bearing housing 60 and the rest of the handle 36.

The proximal handle section 56a includes a tubular body 68 and a transverse bar 70. The bar 70 is attached to a proximal end of the body and includes a pair of grips 72. The distal handle section 56b presents a proximal section 74 that is telescopically received within a distal section 76 of the proximal handle section 56a. The proximal and distal sections 74,76 can be selectively secured to one another with a pin 78. The pin 78 is removable to permit relative sliding and detachment of the sections 74,76. The bearing housing 60 is attached to a distal end of the distal handle section 56b with clips 80 (see FIG. 6). The clips 80 preferably allow the handle sections 56*a,b* to swing relative to the bearing housing 60.

The coupler shaft 58 presents a socket 82 and aligned fastener holes 84. The socket 82 slidably receives the connection shaft 50 of the drum end 40*a*. A pin 86 is inserted through the holes 84 of the coupler shaft 58 and the hole 50*a* of the connection shaft 50 to removably attach the connection shaft 50 and coupler shaft 58 to one another (see FIG. 6).

When attached to the drum end 40*a*, the handle 36 is used to manually shift (e.g., pull) the drum end 40*a* (e.g., when advancing the screed 32 in the forward direction D). At the same time, the handle 36 permits the drum 34 to rotate relative to the handle 36. As will be explained, the power unit 30 rotatably drives the drum 34. Preferably, the handle 36 and the power unit 30 are cooperatively used to manually advance the drum 34 (for instance, when the screed 32 is being advanced/pulled in the forward direction D).

It is within the scope of the present invention for the screed handle may be alternatively constructed and/or attached relative to the drum end. For instance, the bearing housing and the distal handle section could be alternatively attached to one another (e.g., to permit relative swinging movement therebetween).

Furthermore, for certain aspects of the present invention, the concrete screed to be devoid of the handle. For instance, the drum could be supported only by the frame associated with the power unit. In such an alternative embodiment, the frame of the power unit could be configured for attachment to both drum ends.

Power Unit

Figure 9:
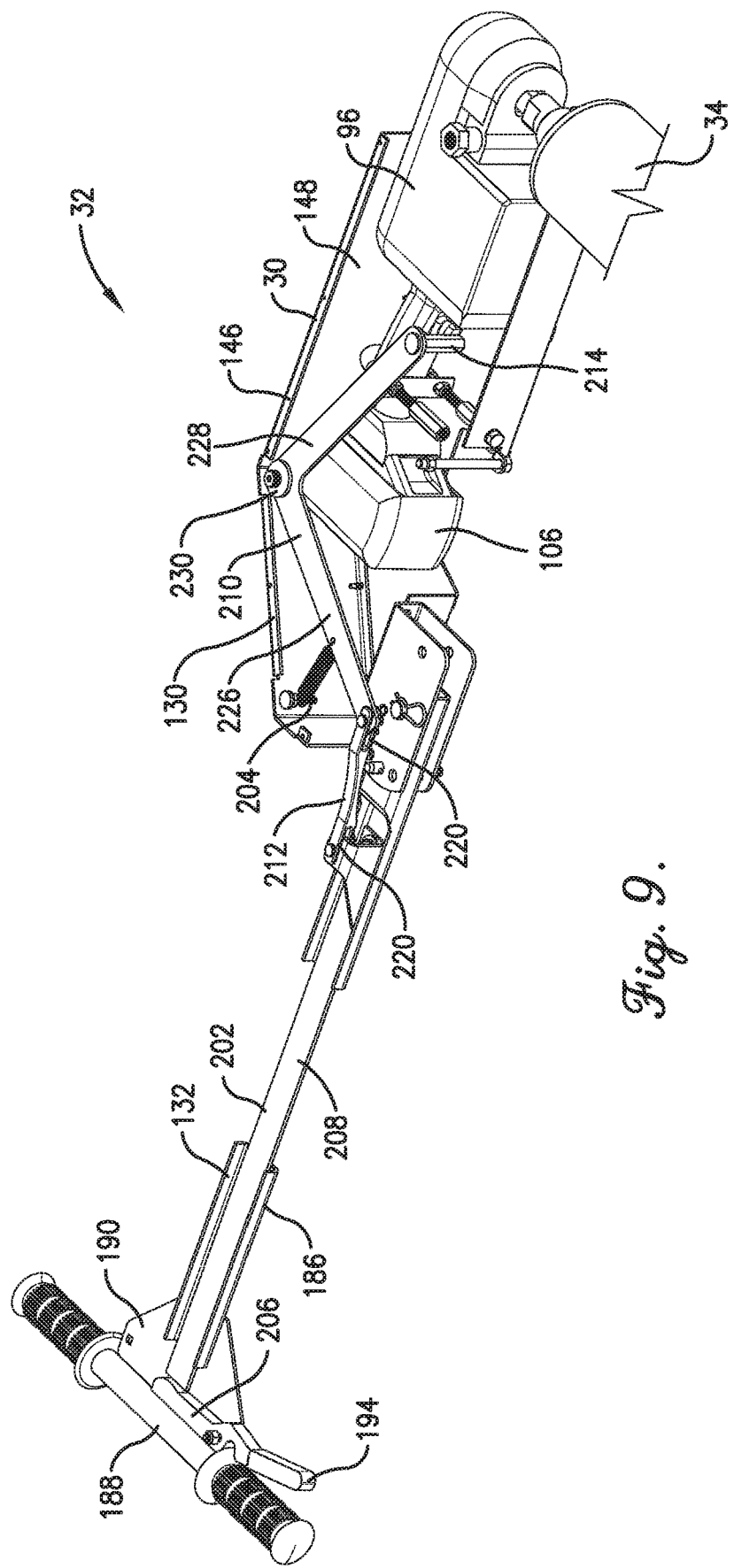
FIG. 9 is a fragmentary perspective of the concrete screed shown in FIGS. 1-8, showing part of the drive housing removed to depict parts of the powered drive and the mechanical control connection contained by the drive housing, with the mechanical control connection being configured to be operated by a lever of the power unit handle and including a linkage and a spring.
Figure 10:
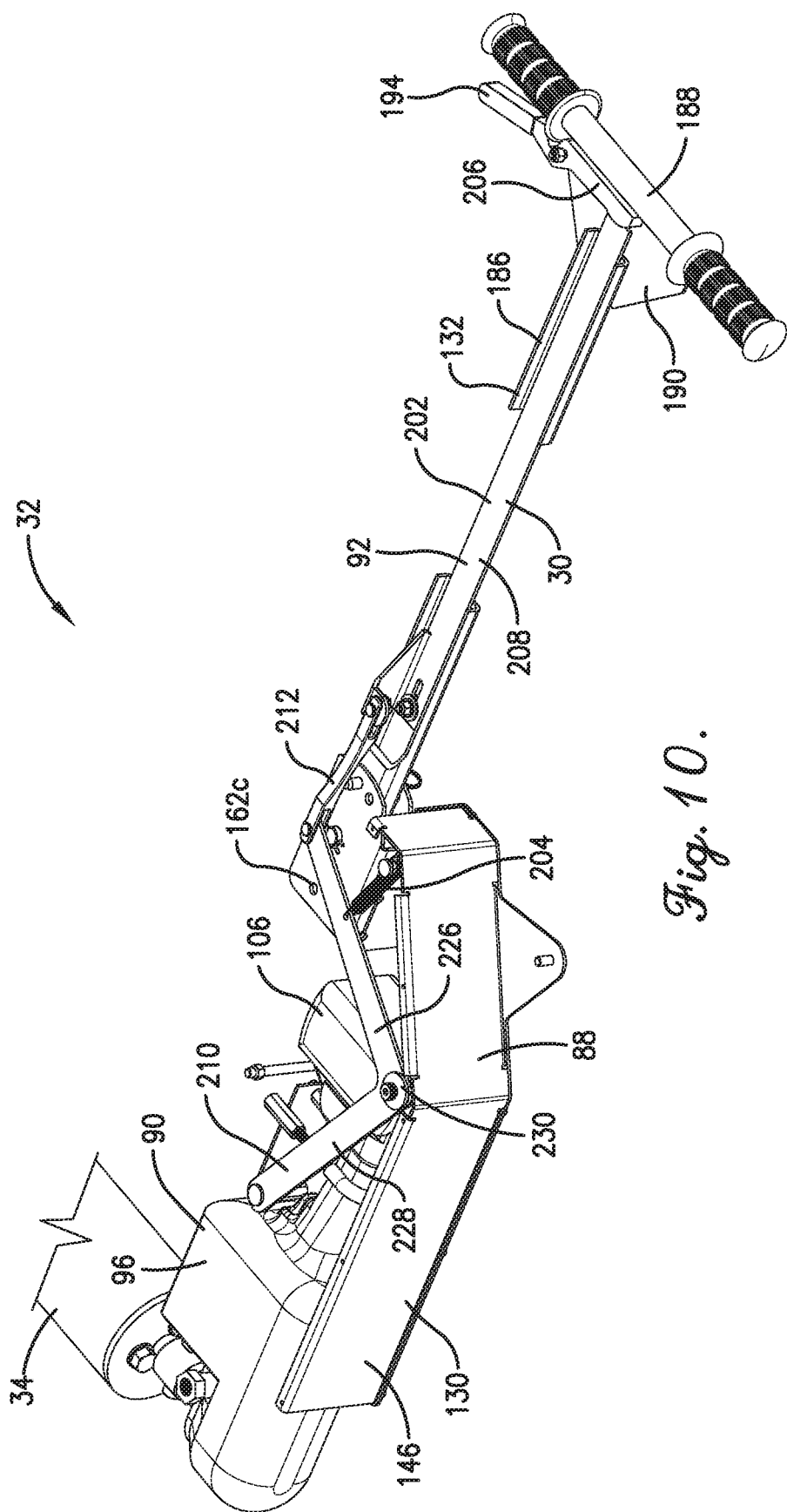
FIG. 10 is a fragmentary perspective of the concrete screed similar to FIG. 9, but taken from the opposite side, showing a crank arm, drive link, connecting link, driven link, and contact arm.
Figure 11:
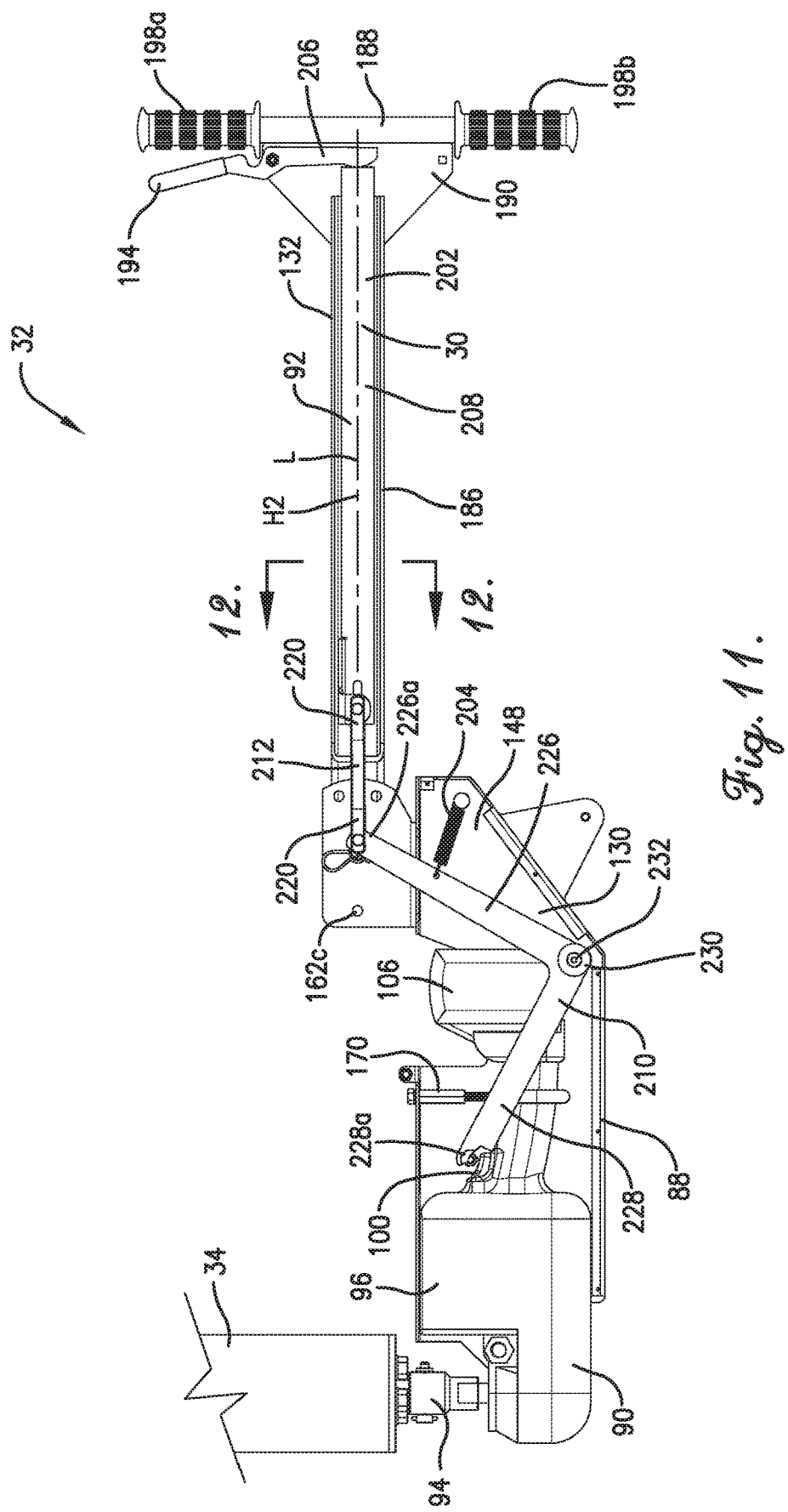
FIG. 11 is a fragmentary top view of the concrete screed shown in FIG. 4, showing a drive control element of the powered drive in an off position and the linkage in a corresponding off condition.

Turning to FIGS. 9-11, the power unit 30 is drivingly connected to the drum 34 and is configured to rotate the drum 34. The power unit 30 also cooperates with the handle 36 to manually advance the drum 34 in the forward direction D. The power unit 30 broadly includes a frame 88, a powered drive 90, a mechanical control connection 92, and a drive coupler 94.

The powered drive 90 provides a motive power source to drive the drum 34. The powered drive 90 includes a power tool case 96, an electric motor 98, a drive control element 100, a transmission 102, a drive shaft 104, and a rechargeable battery 106 (see FIGS. 6, 15, and 24).

In the depicted embodiment, the powered drive 90 is preferably in the form of a cordless right-angle drill that provides continuous, variable-speed drill operation. However, the powered drive 90 could take other forms, consistent with at least some aspects of the present invention.

The power tool case 96 operably supports the electric motor 98, drive control element 100, transmission 102, drive shaft 104, and battery 106 during use. The power tool case 96 includes a head section 96*a* and a handle section 96*b*. The power tool case 96 is preferably a molded housing and preferably includes a synthetic resin material. It will be understood that the power tool case can be alternatively constructed within the ambit of the present invention.

The electric motor 98 is configured to power the drum and includes a rotatable motor shaft 98*a* (see FIG. 24). The motor shaft 98*a* is preferably a rotor shaft of the electric motor 98. The electric motor 98 preferably comprises a continuous variable-speed drive motor operable to drive the drive shaft 104 through a range of rotational speed.

The battery 106 comprises a conventional rechargeable battery. Preferably, the battery 106 is a lithium-ion battery; but could include other types of rechargeable battery configurations (e.g., a nickel-cadmium battery). The battery 106 is slidably attachable to the handle section 96*b* in an installed condition. When installed, the battery 106 is operably coupled to the electric motor 98 to supply electrical power to the motor 98 via operation of the drive control element 100 (see FIGS. 17 and 24).

The drive shaft 104 extends into and out of the power tool case 96 to define a shaft end 108 operable to be drivingly attached to the drive coupler 94 (see TWIGS. 6 and 8). In the depicted embodiment, the shaft end 108 presents external threads 110 and an internal threaded bore 112 that are generally coaxial with one another and coaxial with a rotation axis A2 of the drive shaft 104 (see FIGS. 6 and 8).

Preferably, the external threads 110 are opposed to the threads of the internal threaded bore 112. In particular, the external threads 110 are right-handed and the threads of the internal threaded bore 112 are left-handed, in the illustrated embodiment. It is also within the ambit of the present invention to reverse the thread orientations, with the external threads being left-handed and the threads of the internal threaded bore being right-handed.

Turning to FIG. 24, the transmission 102 drivingly interconnects the electric motor 98 and the drive shaft 104 so that the drive shaft 104 is powered by the electric motor 98 to rotate the drum 34. In particular, the transmission 102 transmits power from the motor shaft 98*a* to the drive shaft 104. Preferably, the transmission 102 enables the motor shaft 98*a* and the drive shaft 104 to be arranged at a right angle to one another. It will be appreciated that the transmission may include a transmission ratio configured to increase or decrease the rotational speed of the drive shaft relative to the motor shaft.

It is within the ambit of the present invention for the transmission to be alternatively configured for transmitting power to the drive shaft. For instance, according to some aspects of the present invention, the transmission may be configured so that the drive shaft does not extend at a right angle to the motor shaft.

Additionally, for some aspects of the present invention, a right-angle configuration may alternatively be provided by mounting the electric motor in the head section 96*a* or adjacent thereto, with the handle section of the case extending transversely relative to the drive shaft of the drive. Also in alternative embodiments, the powered drive could be devoid of the transmission, such that the motor shaft (e.g., rotor shaft) provides the drive shaft of the powered drive.

Figure 13:
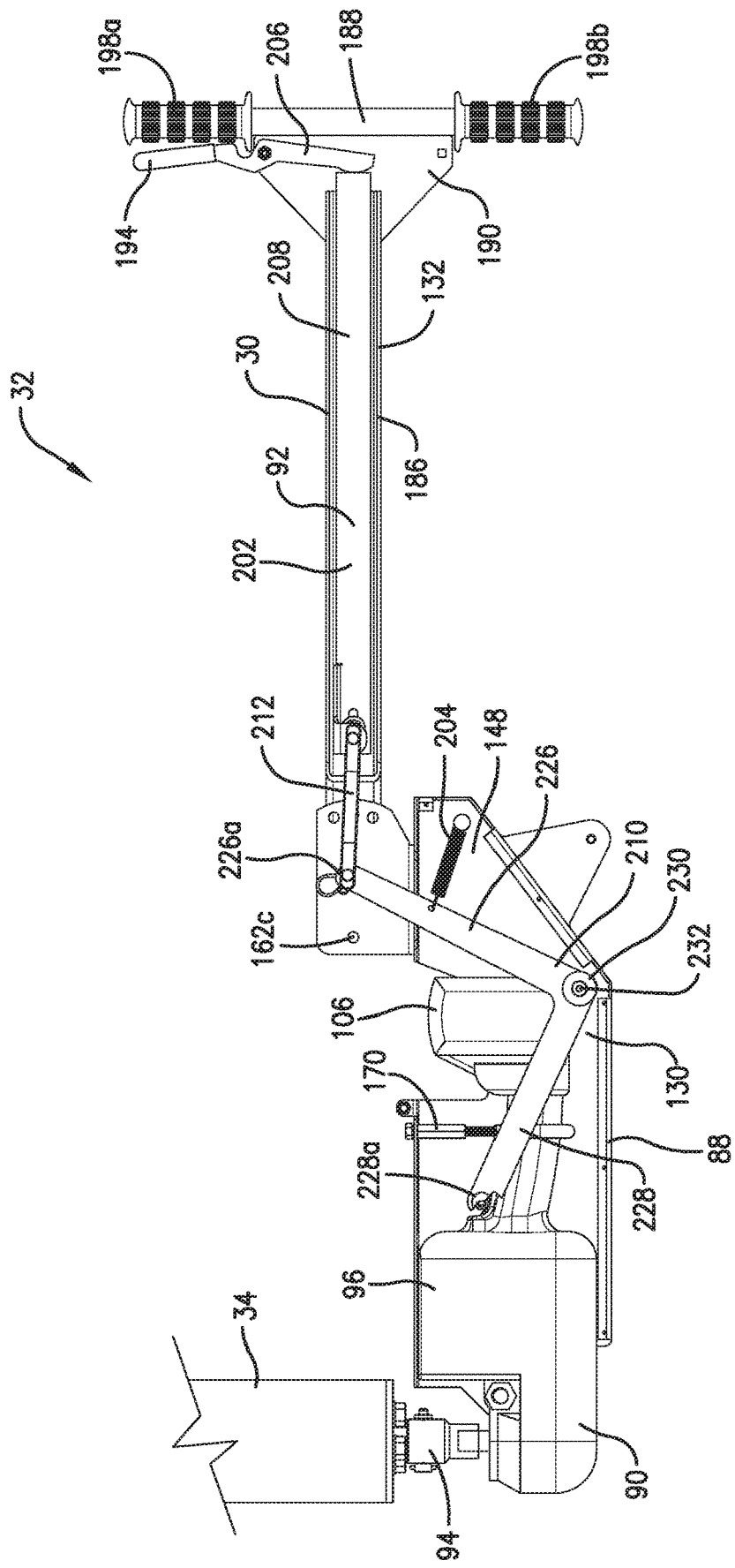
FIG. 13 is a fragmentary perspective of the concrete screed similar to FIG. 11, but showing the lever of the handle swung so that the linkage shifts out of the off condition to shift the drive control element distally out of the off position.
Figure 14:
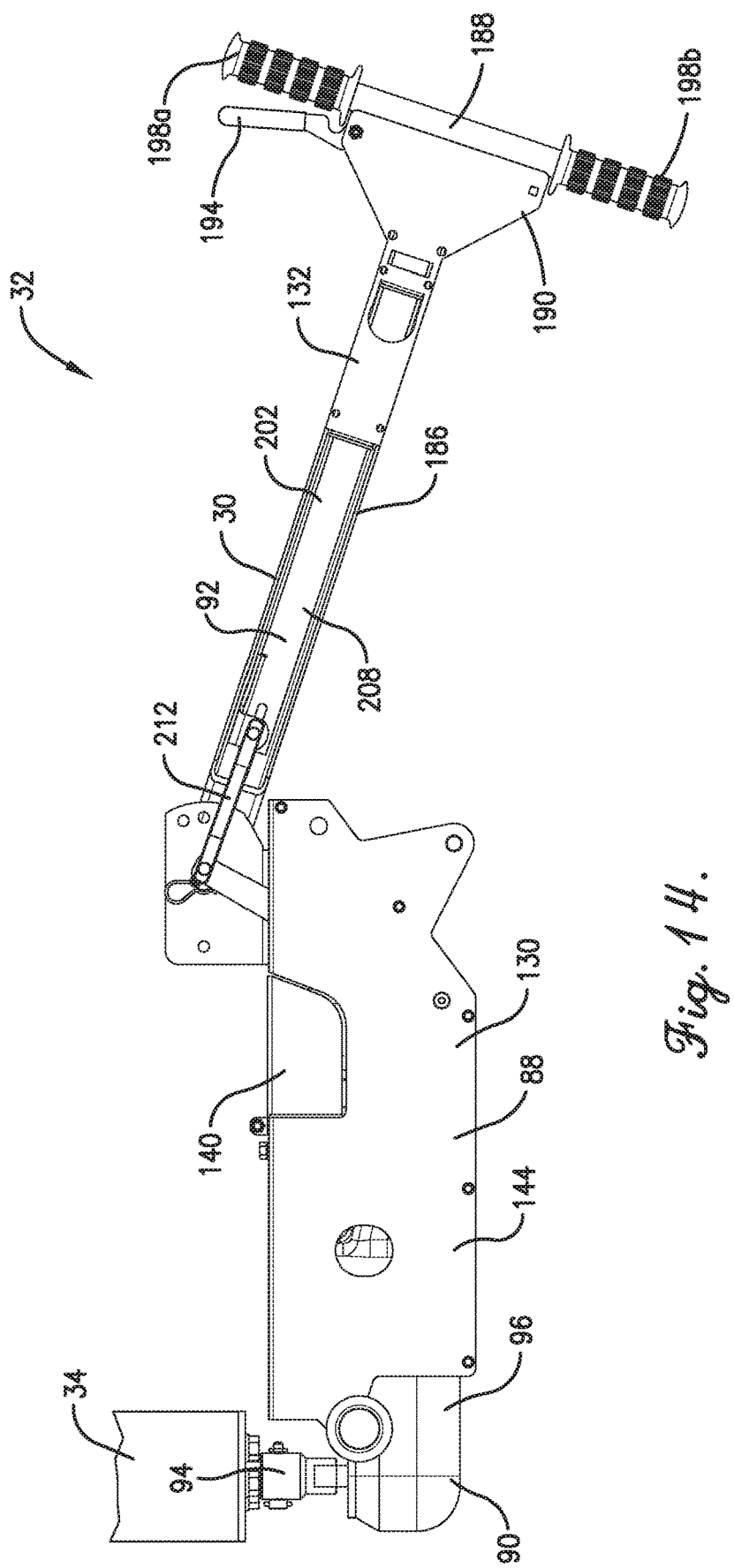
FIG. 14 is a fragmentary perspective of the concrete screed similar to FIG. 11, but showing the power unit handle swung to an outboard operating position.

Turning to FIGS. 11,13, and 15, the drive control element 100 is shiftable to control the electric motor 98 and thereby the rotational speed of the drum 34. The drive control element 100 preferably includes a shiftable button.

The depicted drive control element 100 is shiftable into and out of an off position in which the drive shaft 104 is not rotating (see FIGS. 11 and 15). Preferably, the drive control element 100 is spring-biased into the off position.

Because the powered drive 90 is operable to provide continuous, variable-speed operation, the depicted drive control element 100 is preferably shiftable through a range of "on" positions in which the drive shaft 104 rotates (see FIG. 13). In the usual way, as the drive control element 100 is progressively moved further out of the off position, the rotational speed of the drive shaft 104 proportionally increases.

As will be explained, the drive control element 100 and a drive controller associated with the frame 88 are variably positionable. The position of the drive controller and thereby the position of the drive control element 100 correspond to the rotational speed of the drive shaft 104.

Again, the powered drive 90 is preferably provided by a cordless right-angle drill. However, elements of the powered drive could be provided by an alternative cordless power tool. For certain aspects of the present invention, the powered drive could also include a corded power drive.

For some alternative embodiments associated with the present invention, components of the powered drive could be incorporated as part of the power unit without being provided as part of an off-the-shelf power tool.

As will be discussed, the powered drive 90 is operably supported by a drive housing associated with the frame 88. The powered drive 90 is also preferably operated via a linkage provided as part of the mechanical control connection 92.

The drive coupler 94 is configured to facilitate removable attachment of the power unit 30 to the drum 34 and to impart rotation of the drive shaft 104 to the drum 34. As described below, the drive coupler 94 is configured to align the drive shaft 104 and the connection shaft 50 of the drum end 40*b* on a common rotation axis A2 without permitting off-axis swinging of the shafts 50,104 relative to one another.

Figure 8:
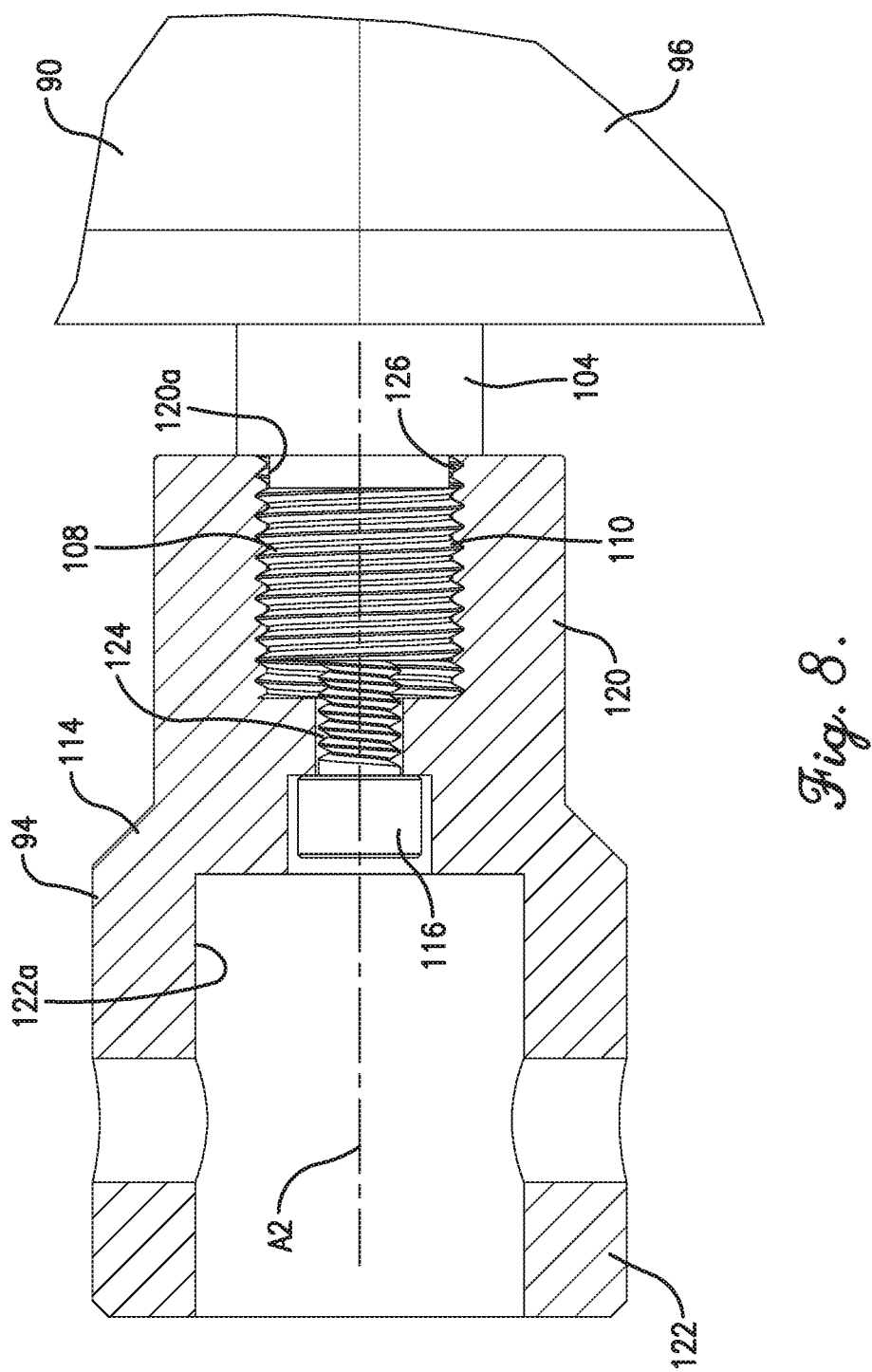
FIG. 8 is an enlarged fragmentary elevation of the powered drive and coupler shown in FIG. 6, showing a coupler body secured to a drive shaft of the powered drive.

The depicted drive coupler 94 includes a coupler body 114, a screw 116, and a removable pin 118 (see FIGS. 6 and 8). The coupler body 114 is preferably a rigid and unitary structure and presents opposite connector portions 120,122 (see FIGS. 6 and 8). The preferred connector portions 120,122 present respective sockets 120*a*,122*a* (see FIG. 8). The coupler body 114 also presents a bore 124 extending axially between the sockets 120*a*,122*a* so that the sockets 120*a*,122*a* communicate with one another (see FIG. 8). As will be explained, the connector portion 120 is removably attached to the drive shaft 104 and the connector portion 122 is removably attached to the connection shaft 50 of the drum end 40*b*.

In the illustrated embodiment, the connector portion 120 presents the socket 120*a* to receive a corresponding part of the drive shaft 104. For some aspects of the present invention, the drive shaft may alternatively include a socket to receive the connector portion of the coupler body.

Preferably, the connector portion 120 includes internal threads 126 associated with the socket 120*a* to engage the external threads 110 of the drive shaft 104 (see FIG. 8). As a result, the connector portion 120 and the drive shaft 104 are threadably engaged and coaxial with one another. The illustrated connector portion 120 and drive shaft 104 are consequently attached relative to one another without permitting off-axis swinging therebetween.

It is contemplated within certain aspects of the present invention for the connector portion 120 and/or the drive shaft 104 to include alternative complemental features that drivingly engage one another. For instance, as will be shown in an alternative embodiment, the connector portion and drive shaft could include a drive connection formed by complemental slot and key features.

The screw 116 preferably comprises a socket head cap screw and is configured to further secure the connector portion 120 to the drive shaft 104. Although the depicted screw 116 is preferred, alternative fasteners (e.g., other threaded fasteners, clips, snap rings, etc.) may used to further secure the connector portion to drive shaft, in accordance with at least some aspects of the present invention.

The screw 116 is inserted through the bore 124 of the coupler body 114 and is threaded into engagement with the internal threaded bore 112 of the drive shaft 104. Preferably, the internal threads 126 of the connector portion 120 are opposed to the threads of the screw 116. As a result, the coupler body 114 rotates in one direction onto the drive shaft 104, while the screw 116 rotates in the opposite direction into engagement with the threaded bore 112 of the drive shaft 104. In the depicted embodiment, the internal threads 126 are right-handed and the threads of the screw 116 are left-handed. It is also within the ambit of the present invention for the thread orientations to be reversed, with the internal threads of the connector portion being left-handed and the threads of the screw being right-handed.

The connector portion 122 of the coupler body 114 presents the socket 122*a* and aligned fastener holes 128. The illustrated socket 122*a* includes a smooth bore and is configured to receive part of the connection shaft 50 of the drum end 40*b*. The socket 122*a* is coaxial with the rotation axis A2, and the fastener bore 128 extends transversely to the rotation axis A2.

The pin 118 of the drive coupler 94 is associated with the connector portion 122 to secure the connector portion 122 to the connection shaft 50 of the drum end 40*b*. Preferably, the pin 118 is removably inserted through the fastener holes 128 and hole 50*a* to drivingly engage the coupler body 114 and the connection shaft 50. The illustrated connector portion 122 and the connection shaft 50 are consequently attached relative to one another without permitting off-axis swinging therebetween.

It is also consistent with at least some aspects of the present invention for the coupler body and the connection shaft to be alternatively connected relative to one another. For instance, the coupler body and the connection shaft could be joined by a connection structure other than a pinned joint (e.g., a threaded joint and/or a joint with a key-and-slot configuration). Yet further, the connector portion 122 and connection shaft 50 may alternatively be constructed to prevent relative rotational movement therebetween. For example, the connector portion and connection shaft may have complemental, non-circular, shapes (e.g., splined, polygonal, etc.) for rotatably fixing the components to one another.

The illustrated drive coupler 94 is configured to align the drive shaft 104 and connection shaft 50 of the drum end 40*b* on a common rotation axis A2 without permitting off-axis swinging of the shafts 50,104 relative to one another. (Those of ordinary skill in the art will appreciate off-axis swinging means positioning of the shaft at an angle (more than mere resilient deflection) relative to the rotation axis A1.) The illustrated drive coupler 94 is consequently, configured to restrict swinging of a drive housing of the frame 88 relative to the drum 34.

Turning to FIGS. 3-5 and 9-23, the frame 88 preferably includes a drive housing 130 and a power unit handle 132 to be grasped by a user to facilitate manual advancement of the concrete screed 32 in the forward direction D.

In the depicted embodiment, the power unit handle 132 of the frame 88 and the screed handle 36 can be manually manipulated by respective users so that the handles 36,132 can cooperatively advance the concrete screed 32.

As will be explained, the handle 132 and drive housing 130 are pivotally attached relative to each other so that the handle 132 is swingable relative to the drive housing 130 about a frame pivot axis P (see FIG. 18) that is transverse to the forward direction D.

Turning to FIGS. 18-23, the drive housing 130 preferably extends along a housing axis H1 to present proximal and distal housing ends 134*a,b* (see FIGS. 3 and 18-20). The illustrated drive housing 130 includes a shell 136, a pivot bracket 138, an access door 140, and a housing handle 142 (see FIGS. 3-5 and 18-20).

The shell 136 is configured to enclose substantial parts of the mechanical control connection 92 and the powered drive 90. The depicted shell 136 includes a channel 144 and a cover 146 that cooperatively define a drive chamber 148 to at least partly receive the powered drive 90 (see FIGS. 15 and 16).

The channel 144 includes a base wall 144a and side walls 144b that extend along the housing axis H1. The side walls 144b include projections 150 configured to support the powered drive 90, as will be explained below (see FIGS. 18-21).

The side walls 144b of the channel 144 also include tabs 152 that cooperatively support the housing handle 142 adjacent the proximal housing end 134a (see FIGS. 2 and 18-22). The handle 142 includes a tube section 142a and a fastener 142b that secures the tube section 142a between the tabs 152 (see FIG. 22). The handle 142 preferably provides a location for grasping the drive housing 130. By providing a grip associated with the frame 88, the handle 142 can be used to carrying the power unit 30 (e.g., when the handle 132 is folded into the transport position). Additionally, the handle 142 is suitable for grasping and holding the drive housing 130 in place as the handle 132 is swung between the transport and operating positions.

The channel 144 further presents an access opening 154 that is presented by the base wall 144a and the side walls 144b (see FIGS. 18, 21, and 23). The access opening 154 communicates with the chamber 148 and permits insertion and removal of the battery 106 relative to the chamber 148.

The access door 140 has a unitary construction and is pivotally mounted to the channel 144 by a fastener 156. The door 140 is preferably operable to swing into and out of a closed condition in which the door 140 substantially covers the access opening 154 and restricts access to the battery 106 (see FIG. 18). The door 140 can also be selectively opened to permit battery insertion and removal (see FIGS. 21 and 23).

The cover 146 is removably attached to respective margins of the side walls 144b by fasteners 158 so that the cover 146 spans the area between the side walls 144b (see FIGS. 16, 18, and 19). The cover 146 and channel 144 cooperatively define a distal opening 160 that is configured to receive a respective part of the powered drive 90 (see FIG. 19).

The pivot bracket 138 is configured to be attached to the power unit handle 132. The bracket 138 is fixed to the channel 144 and includes opposed bracket plates 162 (see FIGS. 18 and 19). The plates 162 each present a hole 162a to receive a pivot pin 164 (see FIGS. 18 and 19) and present holes 162b,c to receive a locating pin 166 (see FIGS. 18-23).

In alternative embodiments, the drive housing may be configured without a shell that encloses substantial parts of the linkage and the powered drive. For some aspects of the present invention, the drive housing may be constructed so that additional features of the powered drive are exposed.

The powered drive 90 is operably and adjustably supported by the drive housing 130 within the drive chamber 148. The power unit 30 includes support fasteners 168 and a drive adjustment device 170 to adjustably support the powered drive 90 relative to the drive housing 130 (see FIGS. 15-17).

Support fasteners 168 swingably attach the powered drive 90 relative to the drive housing 130 at a support joint 172. The powered drive 90 is supported at the joint 172 to swing about a mounting axis M extending transversely to the housing axis H1 (see FIGS. 15-17). The support joint 172 is provided by swingably attaching the projections 150 of the drive housing 130 to the power tool case 96 with support fasteners 168. In particular, the support fasteners 168 are located to extend through respective holes presented by the projections 150. The support fasteners 168 are configured to be threaded into sockets (not shown) of the power tool case 96.

The drive adjustment device 170 shiftably attaches the power tool case 96 to the drive housing 130 at a location spaced from the support joint 172. The drive adjustment device 170 is configured to swingably position the powered drive 90 relative to the drive housing 130.

The drive adjustment device 170 preferably includes a U-bolt 174, a plate 176, threaded nuts 178, threaded sleeves 180, and threaded bolts 182 (see FIGS. 15-17). The U-bolt 174 and plate 176 are fastened to one another by nuts 178 and secured around the handle section 96b of the power tool case 96.

The sleeves 180 and bolts 182 are configured to rotate relative to the U-bolt 174 for shifting the handle section 96b about the mounting axis M. As the handle section 96b is moved, the powered drive 90 correspondingly swings about the mounting axis M. As will be explained, the drive adjustment device 170 is operable to swing the powered drive 90 so that the drive control element 100 can be selectively positioned in relation to the mechanical control connection 92.

For at least some aspects of the present invention, the power unit could include an alternative adjustment mechanism to adjustably position the powered drive relative to the drive housing.

Also, for certain aspects of the present invention, the power unit may not include an adjustment mechanism. For example, another component of the power unit (e.g., the linkage) could be adjustable to provide suitable operation of the power unit.

With the powered drive 90 supported in the drive housing 130, the battery 106 is selectively inserted and removed relative to the drive chamber 148 by moving the battery 106 through the access opening 154 (see FIGS. 21 and 23).

Once inserted at least partly within the drive chamber 148 via the access opening 154, the battery 106 is selectively attached to the handle section 96b (see FIGS. 17 and 23). Similarly, the battery 106 is slidably detachable from the handle section 96b and removable from the drive chamber 148 via the access opening 154 (see FIGS. 17 and 23).

Figure 1:
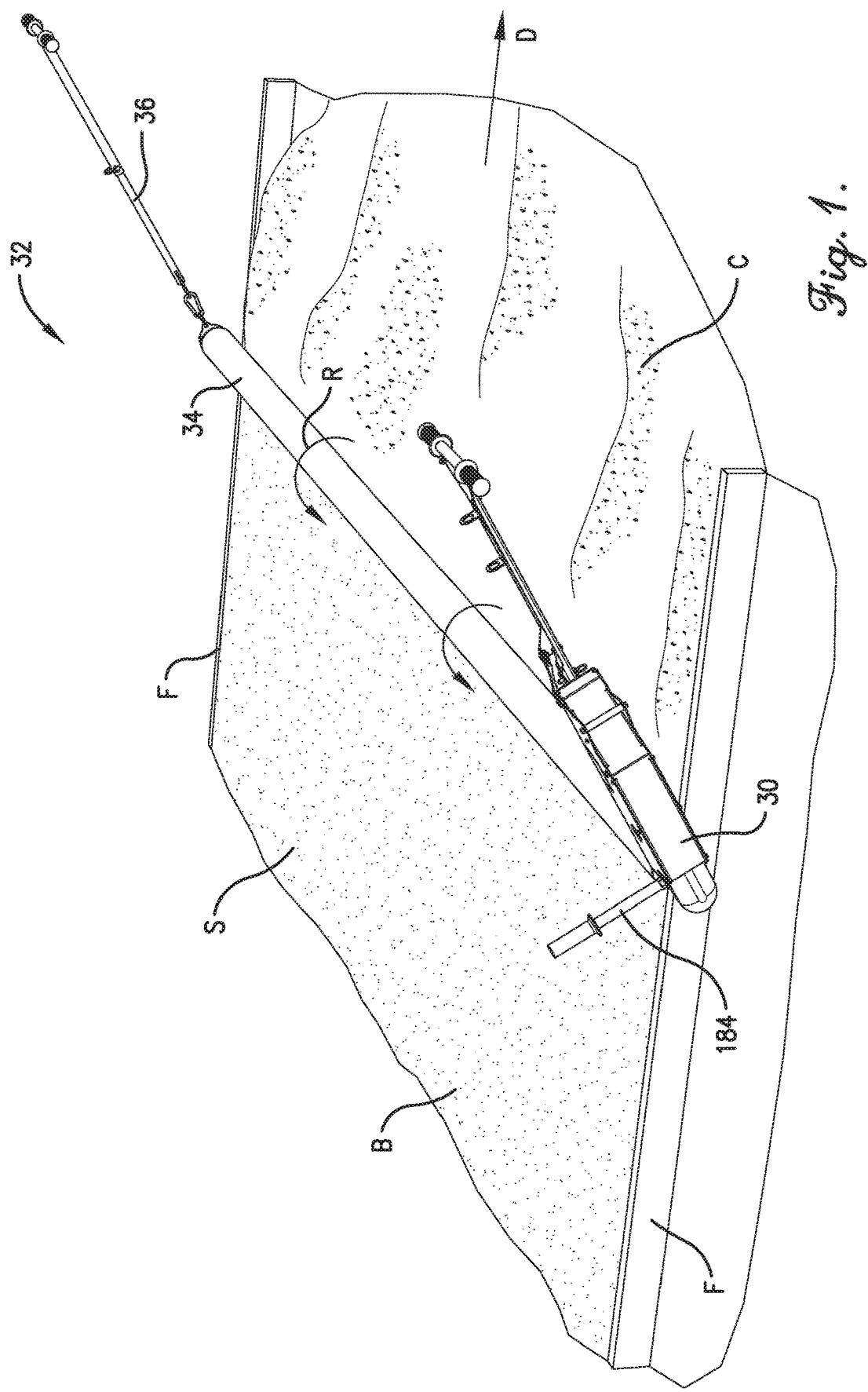
FIG. 1 is a perspective of a concrete screed constructed in accordance with a preferred embodiment of the present invention, showing a power unit, a screed handle, and a rotatable concrete forming drum, with the power unit being swung into in an advancement position in which the power unit is angled to one side of the drum for advancement of the concrete screed along an area of poured concrete.
Figure 2:
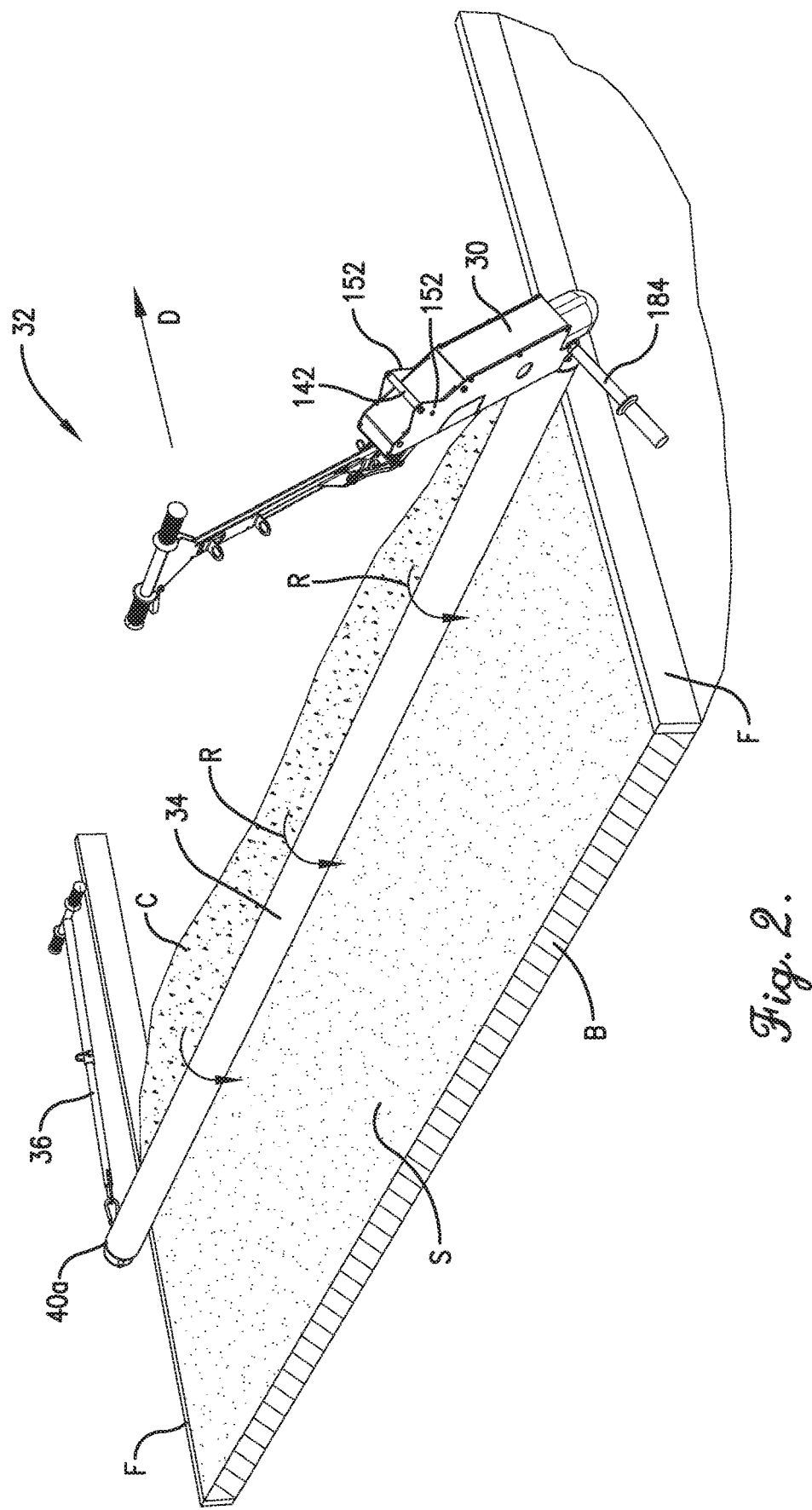
FIG. 2 is a perspective of the concrete screed similar to FIG. 1, but showing the power unit swung into an upright parked position in which the power unit is angled to the other side of the drum and is standing above the ground.
Figure 3:
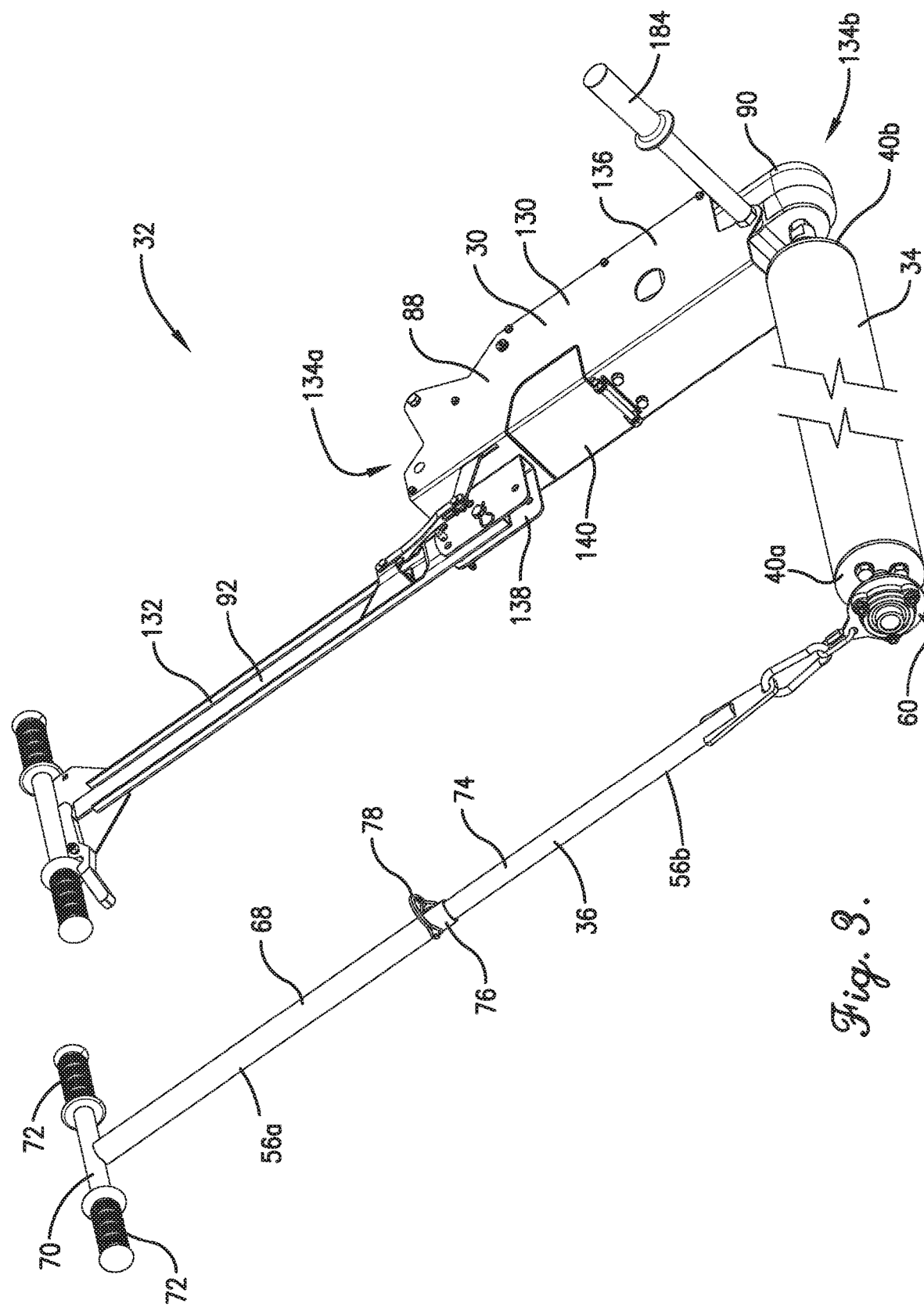
FIG. 3 is a fragmentary perspective of the concrete screed shown in FIGS. 1 and 2, showing the power unit in the advancement position, with the power unit including a frame, a powered drive, a mechanical control connection, and a coupler.
Figure 4:
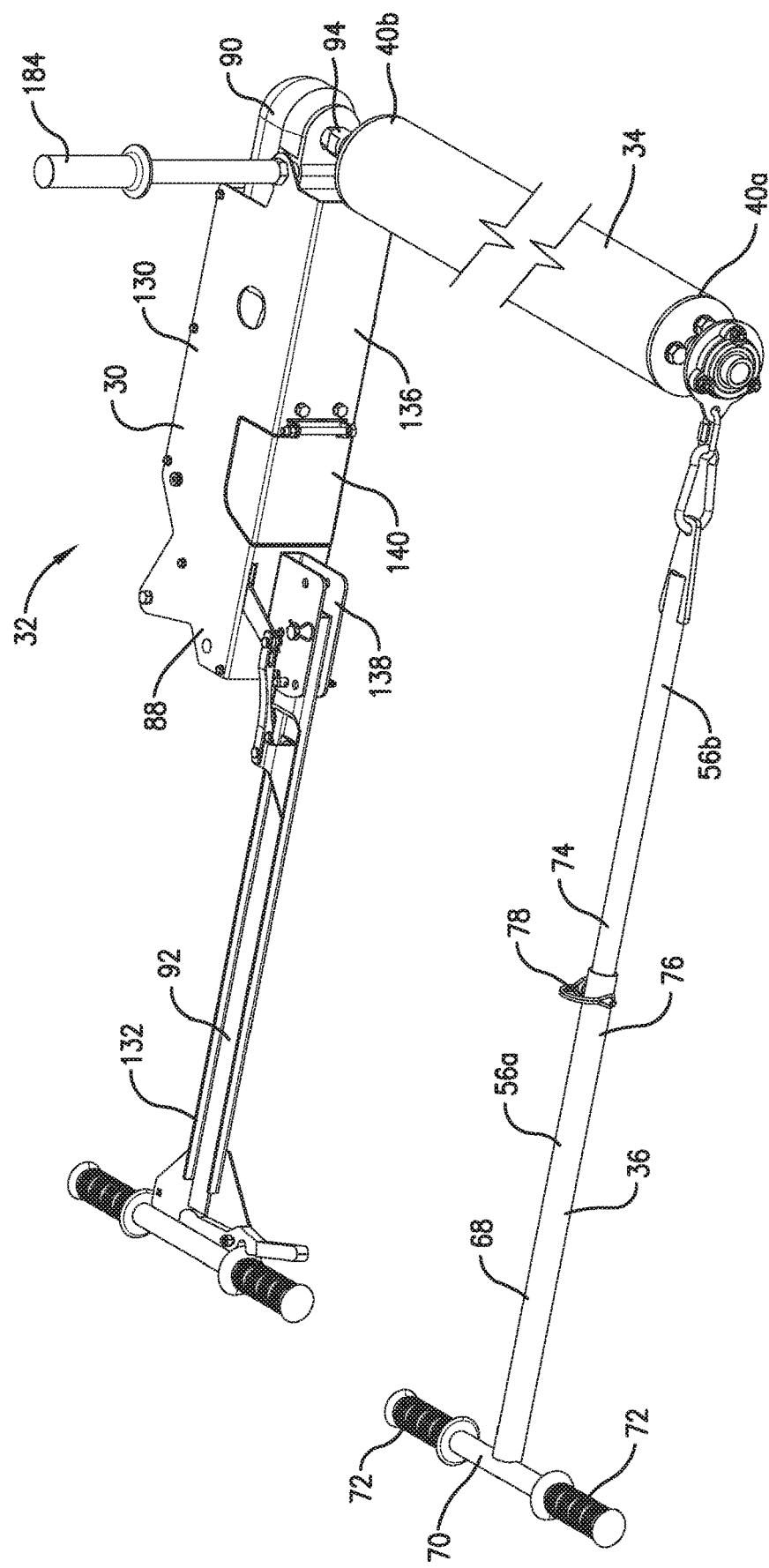
FIG. 4 is a fragmentary perspective of the concrete screed shown in FIGS. 1-3, with the frame including a power unit handle and a drive housing, showing the power unit handle in a central operating position.

The power unit 30 also preferably includes a support stand 184 adjustably attached relative to the drive housing 130 and extending transversely relative to the housing axis H1 (see FIGS. 1 and 2).

The support stand 184 is elongated and includes a ground-engaging end 184a and a threaded attachment end 184b (see FIG. 20). The support fasteners 168 each preferably include a threaded socket 168a (see FIG. 6) for connection to the attachment end 184b. The support stand 184 is configured to be removably attached to either side of the powered drive 90.

When attached to the powered drive 90, the support stand 184 is configured to engage the ground and in part support the drive housing 130 in an upright orientation (see FIG. 2). When parked in the upright orientation, the power unit 30 is angled to one side of the drum 34 and the support stand 184 extends downwardly from the powered drive 90 to engage the ground or another surface (see FIG. 2).

In alternative embodiments, the support stand can be alternatively configured and/or associated with the drive housing without departing from the scope of the present invention. For instance, the support stand and drive housing could be directly attached to one another.

When the concrete screed 32 is assembled, the power unit 30 can be selectively parked in the upright orientation. In particular, when the drum 34 is supported on the form F (or another support surface) and the support stand 184 is also supported on a surface (such as the ground), the support stand 184 and the drum 34 generally cooperate to support the power unit 30 in the parked upright orientation.

For advancement of the concrete screed, the power unit 30 can be swung over to a position where the power unit 30 is angled to the other side of the drum 34 (see FIG. 1). In this position, the support stand 184 extends upwardly from the support fastener 168 and is spaced above the ground (see FIG. 1).

It will also be appreciated that the support stand 184 can be detached from the powered drive 130 and stored on the power unit handle 132 in preparation for screed advancement (see FIG. 20). In this way, the power unit 30 can be angled to either side of the drum 34 for purposes of advancing the screed 32.

Turning to FIGS. 18-23, the power unit handle 132 is configured to facilitate manual advancement of the concrete screed 32 in the forward direction D. The handle 132 includes a handle body 186, a transverse bar 188, a pair of opposed plates 190, a stand storage bracket 192, and a shiftable user-operated drive controller 194.

The handle body 186 extends along a handle axis H2 and presents proximal and distal ends 186a,b (see FIGS. 11 and 18). The body 186 presents an open channel 196 that extends axially between the proximal and distal ends 186a,b (see FIGS. 12 and 20). As will be explained, the body 186 is pivotally attached to the pivot bracket 138 of the drive housing 130 adjacent the distal end 186b. The bar 188 is attached to the proximal end 186a of the body 186 and includes a pair of grips 198a,b (see FIGS. 11 and 18).

The drive controller 194 preferably comprises a lever pivotal relative to the grips 198a,b. The drive controller 194 is integrally formed with a crank arm of the mechanical control connection 92, The drive controller 194 is pivotally attached to the plates 190 with a fastener 200 at a first location adjacent the grip 198a (see FIGS. 18 and 20). Some aspects of the present invention contemplate the use of an alternative controller (e.g., a push button, a switch not clasped within the user's palm, etc.).

The drive controller 194 is also configured to be attached to the plates at a second location adjacent the grip 198b on the opposite side of the handle body 186. Thus, the drive controller 194 is operable to be configured for either right-handed or left-handed operation.

The power unit handle 132 and drive housing 130 are pivotally attached relative to each other, In particular, the handle 132 is swingable relative to the drive housing 130 about the frame pivot axis P, which is generally transverse to the forward direction D. Preferably, the body 186 of the handle 132 is pivotally attached to the bracket 138 of the drive housing by the pivot pin 164. The body 186 is also selectively attached to the bracket 138 by the locating pin 166.

Turning to FIGS. 18-20, the depicted handle 132 is operable to swing between any, of several operating positions and a transport position. In the transport position, the handle 132 extends from the frame pivot axis P to at least partly extend alongside the drive housing 130, such that the frame 88 is folded. The locating pin 166 is selectively positioned to extend through the bracket 138 and the handle 132 to restrict movement out of the transport position.

Also in the transport position, the power unit 30 defines a transport center of gravity CG (see FIG. 18). The handle 132 preferably extends axially on opposite sides of the transport center of gravity CG in the transport position when the housing axis H1 is oriented laterally to facilitate manual carrying of the power unit. In the transport position, the handle 132 preferably extends so that the handle 132 and the drive housing 130 are generally coextensive with one another. For some aspects of the present invention, the frame could have an alternative transport position (e.g., where the handle is alternatively oriented relative to the drive housing).

Turning to FIGS. 11-14 and 21-23, in each of the operating positions, the handle 132 extends outwardly relative to the drive housing 130, The operating positions preferably include a series of discrete positions in which the handle 132 can be fixed (such that swinging of the handle 132 relative to the drive housing 130 is restricted). The discrete positions include an inboard position, a central position, and an outboard position.

In any one of the discrete positions, the locating pin 166 is selectively positioned to extend through corresponding bracket holes 162b (see FIG. 18) in the bracket 138 and a corresponding hole in the handle 132. The bracket holes 162b are associated with the inboard, central, and outboard positions, respectively. The locating pin 166 is secured in any one of the operating positions to restrict movement out of that position. In one example, the locating pin 166 can be used to secure the handle 132 in the central position (see FIG. 11) and subsequently used to secure the handle 132 in the outboard position (see FIG. 14).

The frame 88 is also preferably configured to provide operating positions, other than the inboard, central, and outboard positions, for which the handle 132 and drive housing 130 are not joined by the locating pin 166. For instance, the handle 132 could be located between the outboard position and the central position. The depicted handle 132 also preferably provides operating positions inboard of the inboard position. Similarly, the handle 132 preferably provides operating positions outboard of the outboard position (up to the point at which the handle 132 contacts a corner of the drive housing 130).

When operating the power unit 30 without securing the locating pin 166 to the handle 132 and drive housing 130, it will also be understood that the handle 132 is preferably freely swingable among a range of operating positions.

For some aspects of the present invention, the frame could have one or more alternative operating positions (e.g., where the handle is alternatively oriented relative to the drive housing).

In use, the frame 88 of the power unit 30 and the screed handle 36 are cooperatively, used to manually advance the drum 34 in the forward direction D. When the power unit 30 is attached to the drum end 40b of the drum 34, the power unit handle 132 can be located in one of the operating positions and used to manually shift (e.g., pull) the drum end 40b (e.g., in the forward direction D). At the same time, the frame 88 permits the drum 34 to rotate relative to the power unit handle 132.

The power unit 30 can be selectively prepared for transport by being detached from the drum end 40b and by swinging the power unit handle 132 to the transport position. In alternative embodiments, the power unit handle could be variously configured without departing from the scope of the present invention.

According to certain aspects of the present invention, the power unit handle 132 and the drive housing 130 may alternatively be attached relative to one another. For example, in alternative embodiments, the power unit handle could be shiftably attached relative to the drive housing with an alternative pivot connection and/or a sliding connection. Also, for some aspects of the present invention, the power unit handle could be fixed relative to the drive housing.

Although the screed 32 preferably involves the use of both the power unit 30 and the screed handle 36, for some aspects of the present invention, the screed may alternatively utilize an alternative handle configuration.

For instance, the screed may alternatively be configured to use only a single handle (e.g., a handle like the power unit handle 132) to manually shift (e.g., pull) the screed. In such an alternative embodiment, the frame of the power unit may be configured for attachment relative to both drum ends. It will be appreciated that such an alternative construction may be more suitable for instances when the drum presents a relatively short drum length.

Turning to FIGS. 9-14, the mechanical control connection 92 is configured to facilitate selective operation of the powered drive 90 when the power unit handle 132 is in one of the operating positions. The mechanical control condition 92 is preferably shiftable into and out of an off condition associated with the off position of the drive control element 100. As will also be explained, the mechanical control connection 92 preferably restricts operation of the powered drive 90 when the handle 132 is in the transport position.

In the illustrated embodiment, the mechanical control connection 92 extends between the drive controller 194 and the drive control element 100 so that shifting of the drive controller 194 corresponds with shifting of the drive control element 100. The mechanical control connection 92 preferably includes a linkage 202 and a spring 204.

The linkage 202 is operably interposed between the drive controller 194 and the drive control element 100. As will be explained, the linkage 202 is configured so that the drive controller 194 is shiftable to operate the powered drive 90 when the handle 132 is in an operating position. Also, the drive controller 194 is restricted from operating the powered drive 90 when the handle 132 is in the transport position. When located in an operating position, the linkage 202 is shiftable into and out of the off condition.

The linkage 202 in the illustrated embodiment includes a crank arm 206, a slidable drive link 208, a rotatable driven link 210, a connecting link 212, and a contact arm 214 (see FIG. 9).

In the preferred embodiment, the crank arm 206 is integrally formed with the drive controller 194. The crank arm 206 and drive controller 194 are pivotally attached to the plates 190 with a fastener at a first location associated with the grip 198a (see FIG. 20). Again, the crank arm 206 and drive controller 194 are also configured to be attached to the plates 190 at a second location associated with the grip 198b.

The drive link 208 is unitary and extends axially to define proximal and distal link ends 208a,b associated with the proximal and distal ends 186a,b. The drive link 208 includes an elongated link body 216a and a tab 216b associated with the distal link end 208b (see FIGS. 12 and 20).

Figure 12:
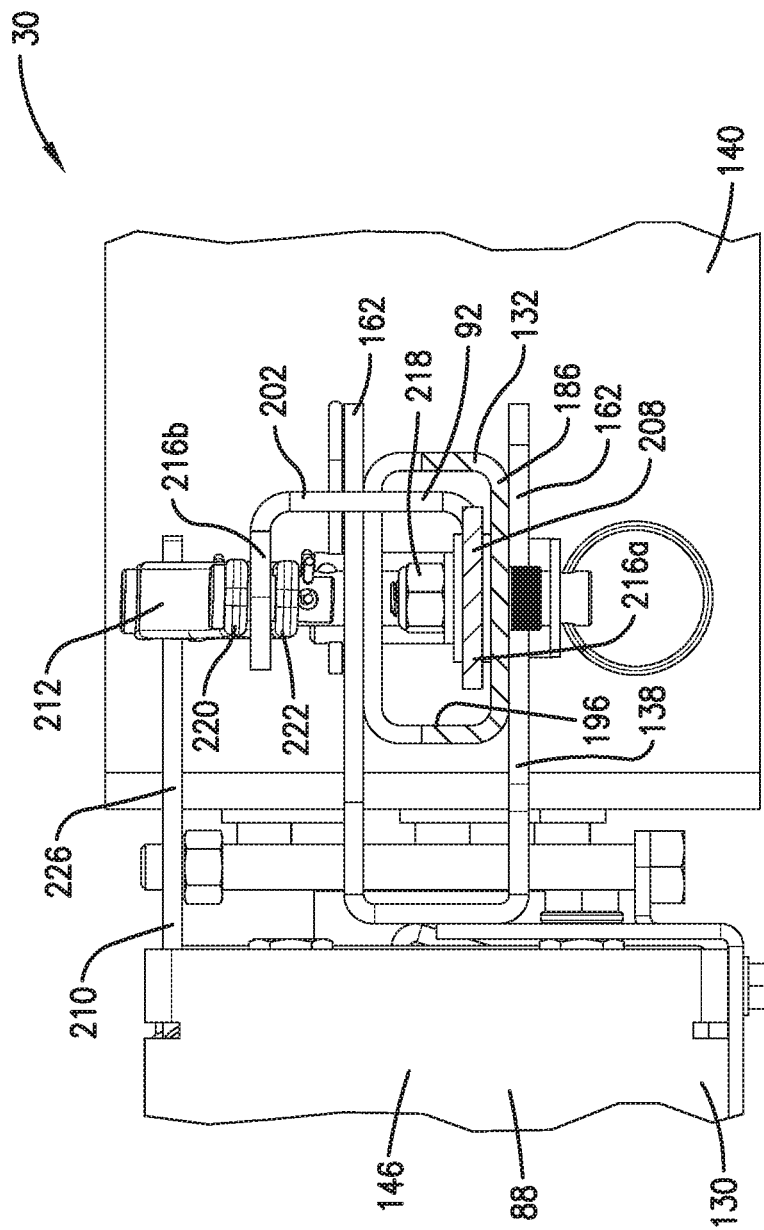
FIG. 12 is a cross section of the concrete screed taken along line 12-12 in FIG. 11.

The drive link 208 is at least partly located within the open channel 196 and is slidably attached to the handle 132 with a fastener 218 (see FIGS. 12 and 20). Preferably, the drive link 208 is slidable relative to the handle 132 along a link axis L parallel to the handle axis H2 (see FIG. 11). For at least certain aspects of the present invention, the drive link 208 could be alternatively shiftably supported relative to the handle 132.

The proximal link end 208a of the drive link 208 is operable to be slidably engaged by the crank arm 206. As will be explained, the drive link 208 is spring-biased toward a proximal position associated with the off condition. As the user engages the drive controller 194 to rotate the crank arm 206 distally, the crank arm 206 shifts the drive link 208 distally along the handle axis H2.

The connecting link 212 is unitary and includes a pair of endmost yokes 220 that present respective slots 222. (see FIGS. 12 and 20). One of the yokes 220 receives the tab 216b in the corresponding slot 222 and is pivotally attached to the tab 216b with a pin 224 (see FIG. 20). The other yoke 220 receives the driven link 210 and is pivotally attached to the driven link 210 with another pin 224 (see FIG. 20).

The driven link 210 is also unitary and includes a pair of link arms 226,228. The link arms 226,228 extend radially from a link base 230 to present spaced-apart link ends 226a,228a (see FIG. 11). The contact arm 214 is attached to the link arm 228 adjacent the link end 228a and extends transversely from the link arm 228 (see FIGS. 15 and 16).

In the depicted embodiment, the link base 230 is pivotally attached to the channel 144 so that the driven link 210 is located partly within the drive chamber 148 and pivots at a link joint 232 (see FIG. 11). The link arm 226 extends through an elongated slot 234 (see FIG. 20) presented by the drive housing 130 so that the link end 226a is located outside of the drive housing 130. The link end 226a is pivotally attached to one yoke 220 of the connecting link 212 to form a linkage pivot joint 236 that permits relative pivoting about a linkage pivot axis (see FIG. 23).

The driven link 210 is rotatable into and out a stop position associated with the off condition of the linkage 202. In the stop position, a portion of the drive housing 130 provides a stop 238 (see FIG. 20) to engage the driven link 210 and restrict proximal shifting of the driven link 210.

As the user engages the drive controller 194 to rotate the crank arm 206 distally, the crank arm 206 shifts the drive link 208 and the connecting link 212 distally along the handle axis H2. The connecting link 212 correspondingly swings the driven link 210 about the link axis L so that the link end 228a and the drive control element 100 move distally.

The configuration of the depicted linkage 202 allows the power unit handle 132 to be folded relative to the drive housing 130 when the linkage 202 is in the off condition. As noted, the linkage pivot axis T allows the driven link 210 to swing relative to the connecting link 212 and the drive link 208. Preferably, the linkage pivot axis T is arranged to be generally parallel to the frame pivot axis P (see FIG. 23). Furthermore, the frame pivot axis P and the linkage pivot axis are preferably adjacent one another, with any relative axial offset being relatively small, particularly when the linkage 202 is in the off condition (see FIG. 23). It will be appreciated that the connecting link 212, including the slots 22, is configured to accommodate the relative offset of the frame pivot axis P and linkage pivot axis T. With this arrangement of the linkage pivot axis the linkage 202 permits swinging of the handle 132 in the off condition. For some aspects of the present invention the frame pivot axis P and linkage pivot axis T could be alternatively positioned relative to each other (e.g., the axes P,T could be coaxial).

In the depicted embodiment, it will be appreciated that the links provided by the linkage all comprise rigid structural elements. That is, each of the crank arm 206, slidable drive link 208, rotatable driven link 210, connecting link 212, and contact arm 214 is a rigid structure. That is, the illustrated linkage is preferably devoid of a continuously flexible element (such as a cable, string, rope, etc.) capable of being transmitting a tension force. However, it is contemplated within certain aspects of the present invention for the linkage to include a continuously flexible element.

The linkage 202 could be variously alternatively configured to provide desired linkage operation and handle-folding capability, in accordance with at least some aspects of the present invention. It is also contemplated, within particular aspects of the present invention, that the linkage could restrict folding of the handle (e.g., for frame embodiments where the handle and drive housing a rigidly attached to one another).

The linkage 202 preferably enables the drive controller 194 and the drive control element 100 to be variably positionable, with the position of the drive controller 194 corresponding to a position of the drive control element 100.

The linkage 202 is configured to be shifted into and out of an off condition, which is associated with the drive control element 100 in the off position, when the power unit handle 132 is in one of the operating positions (see FIG. 11). For instance, when the handle 132 is in an operating position, the crank arm 206 and links 208,210,212 are cooperatively shiftable to move the drive control element 100 out of the off position. However, in the preferred embodiment, the linkage 202 is restricted from moving out of off position when the handle 132 is in the transport position.

As explained above, the depicted drive control element 100 is preferably shiftable through a range of "on" positions in which the drive shaft 104 rotates so that the powered drive 90 provides continuous, variable-speed operation. In particular, as the drive control element 100 is progressively moved further out of the off position, the rotational speed of the drive shaft 104 proportionally increases.

As the user engages the drive controller 194 to rotate the crank arm 206 distally, the driven link 210 swings about the link axis L so that the link end 228a engages the drive control element 100 and moves the drive control element 100 distally away from the off position.

Preferably, as the user progressively moves the crank arm 206 distally, the linkage 202 progressively moves the drive control element 100 distally so that the rotational speed of the drive shaft progressively increases.

Although the linkage 202 is freely shiftable in the operating positions, components of the linkage 202 are preferably restricted from shifting when the handle 132 is in the transport position.

The handle 132 is generally shiftable into the transport position when the linkage 202 is located in the off condition. With the handle 132 folded into the transport position, the driven link 210 preferably engages the stop 238 of the drive housing 130. The driven link 210 and the stop 238 engage one another to restrict the links 208,210,212 from shifting distally out of the off position. Consequently, the driven link 210 engages the stop 238 to restrict linkage shifting associated with movement of the drive control element 100 out of the off position.

It is within the scope of certain aspects of the present invention for the power unit to be provided with an alternative stop to restrict linkage movement. For instance, another part of the frame or another relatively stationary structure could be configured to engage the linkage (e.g., one or more links other than the driven link) to prevent shifting of the drive controller (i.e., the lever) out of the off position when the frame is folded for transport.

The mechanical control connection 92 preferably includes the spring 204 to urge the linkage 202 toward the off condition. The illustrated spring 204 comprises a coil spring with opposite spring ends 204a attached to the channel 144 and the link arm 226, respectively.

As the user moves the crank arm 206 distally to shift the linkage 202 out of the off condition, the spring 204 exerts a progressively increasing biasing force against the driven link 210 along a proximal direction. Consequently, the spring 204 urges the driven link 210 and the rest of the linkage 202 toward the off condition (and thereby the lever to the off position).

For at least some aspects of the present invention, the spring 204 could be alternatively constructed and/or positioned to apply a biasing force to the linkage 202. For instance, it will be appreciated that a torsion spring could be associated with the link base to urge the driven link toward the off condition. Similarly, a spring could be configured to apply a biasing force to another part of the linkage (e.g., the lever) to urge the link to the off position.

In operation, the power unit 30 is drivingly attached to the drum 34 by the drive coupler 94. In particular, the connector portion 120 of the drive coupler 94 is removably attached to the drive shaft 104, and the connector portion 122 of the drive coupler 94 is removably attached to the connection shaft 50 of the drum end 40b. The drive coupler 94 is operable to restrict swinging of the power unit 30 relative to the drum 34. Similarly, the power unit 30 can be selectively uncoupled from the drum 34 by detaching the drive coupler 94 from the connection shaft 50 and/or the drive shaft 104.

When the power unit 30 is attached to the drum end 40b of the drum 34, the power unit handle 132 can be located in one of the disclosed operating positions and used to manually shift the drum end 40b (e.g., in the forward direction D). At the same time, the frame 88 permits the drum 34 to rotate (with the drive shaft 104) relative to the power unit handle 132. When detached from the drum 34 and not in use, the frame 88 of the power unit 30 can be selectively folded from an operating position to a transport position.

The mechanical control connection 92 is configured to facilitate selective operation of the powered drive 90 when the power unit handle 132 is in one of the operating positions. The mechanical control condition 92 is preferably shiftable into and out of an off condition associated with the off position of the drive control element 100.

As the user shifts the drive controller 194 to swing the crank arm 206 distally, the crank arm 206 shifts the drive link 208 and the connecting link 212 distally along the handle axis H2 The connecting link 212 correspondingly swings the driven link 210 about the link axis L so that the link end 228a and the drive control element 100 move distally. The mechanical control connection 92 preferably restricts operation of the powered drive 90 when the handle 132 is in the transport position.

The power unit handle 132 and the screed handle 36 can be manually manipulated by respective users so that the handles 36,132 can cooperatively advance the concrete screed 32 along the poured concrete C. As the concrete screed 32 is advanced forwardly to grade the surface S, the drum 34 rotates in rotation direction R so that excess concrete along the drum 34 is directed forwardly ahead of the drum 34 (see FIGS. 1 and 2).

Turning to FIGS. 25-27, an alternative power unit 300 is constructed in accordance with a second preferred embodiment of the present invention. For the sake of brevity, the following description will focus primarily on the differences of the power unit 300 when compared to the previous embodiment.

The power unit 300 preferably includes, among other things, a frame 302, an alternative powered drive 304, and an alternative coupler 306.

The powered drive 304 includes a power tool case 308 and an alternative drive shaft 310. The drive shaft 310 extends into and out of the power tool case 96 and includes a rotating base 312 and a shaft end 314. The base 312 includes a pair of keys 316 on opposite sides of the shaft end 314. The shaft end 314 presents a cylindrical outer surface 318 and an internal threaded bore 320 that are generally coaxial with one another and coaxial with a rotation axis A2 of the drive shaft 310.

The drive coupler 306 is configured to facilitate removable attachment of the power unit 300 to the drum. The drive coupler 306 is configured to align the drive shaft 310 and the connection shaft of the drum on a common rotation axis A2 without permitting off-axis swinging of the drive shaft 310 and the connection shaft relative to one another.

The drive coupler 306 includes a coupler body 322 and a screw 324. The coupler body 322 is preferably a rigid and unitary structure and presents opposite connector portions 326,328. The connector portions 326,328 present respective sockets 326a,328a. The coupler body 114 also presents a bore 330 extending axially between the sockets 326a,328a so that the sockets communicate with one another.

Preferably, the socket 326a has a smooth inner bore 332 to slidably receive the shaft end 314 of the drive shaft 310. The connector portion also presents a drive slot 334 that removably receives the keys 316 associated with the drive shaft 310, The keys 316 are drivingly engaged with the slot 334 to cooperative provide a drive connection between the connector portion 326 and the drive shaft 310.

The screw 324 is configured to further secure the connector portion 326 to the drive shaft 310. The screw 324 is inserted through the bore 332 of the coupler body 322 and is threaded into engagement with the internal threaded bore 320 of the drive shaft 310.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A power unit for a concrete screed, wherein the screed includes a rotatable concrete forming drum with a connection shaft, and the screed is configured to be manually advanced in a forward direction, said power unit comprising:

a frame including a drive housing and a handle to be grasped by a user, with the handle being configured to facilitate manual advancement of the concrete screed in the forward direction, said handle and said drive housing being pivotally attached relative to each other so that the handle is swingable relative to the drive housing about a pivot axis that is transverse to the forward direction;

a powered drive being operably supported by the drive housing and including a rotatable drive shaft; and a drive coupler attached to the drive shaft and removably attachable to the connection shaft of the drum so that rotation of the drive shaft is imparted to the connection shaft, said drive coupler configured to align the drive and connection shafts on a common rotation axis without permitting off-axis swinging of the shafts relative to one another, such that swinging of the drive housing relative to the drum is at least substantially restricted.

2. The power unit as claimed in claim 1,
said powered drive comprising a right-angle drill that includes an electric motor and a transmission that drivingly connects the electric motor to the drive shaft.

3. The power unit as claimed in claim 2,
said right-angle drill including a battery operably coupled to the electric motor and configured to power the electric motor.

4. The power unit as claimed in claim 2,
said drive housing presenting opposite proximal and distal housing ends and a housing axis extending between the housing ends, with the right-angle drill supported to extend axially relative to the housing ends,
said handle and said drive housing being pivotally attached relative to each other so that the handle is swingable relative to the drive housing about a pivot axis adjacent the proximal housing end.

5. The power unit as claimed in claim 4,
said drive shaft located adjacent the distal housing end.

6. The power unit as claimed in claim 5,
said handle being swingable relative to the drive housing into and out of an operating position, with the handle extending proximally from the pivot axis in the operating position.

7. The power unit as claimed in claim 1,
said drive coupler including a rigid, unitary coupler body and presenting opposite first and second connector portions, with said first connector portion being fixed to the drive shaft and said second connector portion being fixable to the connection shaft.

8. The power unit as claimed in claim 7,
one of said first connector portion and said drive shaft including a key and the other of said first connector portion and said drive shaft including a complementally-shaped slot that slidably receives the key, with the first connector portion being fixed to the drive shaft at least in part by the key and slot.

9. The power unit as claimed in claim 8,
said drive coupler including a fastener further interconnecting the first connector portion and the drive shaft.

10. The power unit as claimed in claim 9,
said fastener threadably engaging the drive shaft,
said drive shaft and said fastener being coaxial with the common rotation axis,
said fastener and said drive shaft presenting respective oppositely directed threads, such that the drive coupler rotates in a first direction onto the drive shaft and the fastener rotates in a second opposite direction into engagement with the drive shaft.

11. The power unit as claimed in claim 9,
said second connector portion presenting a socket configured to receive at least part of the connection shaft of the drum.

12. The power unit as claimed in claim 11,
said drive coupler including a pin associated with the second connector portion,
said pin extending traversely to the common rotation axis and being operable to drivingly, engage the coupler body and the connection shaft.

13. The power unit as claimed in claim 7,
said first connector portion and said drive shaft being threadably interengaged.

14. The power unit as claimed in claim 13,
said first connector portion presenting a first socket receiving at least part of the drive shaft.

15. The power unit as claimed in claim 13,
said drive coupler including a fastener further interconnecting the first connector portion and the drive shaft.

16. The power unit as claimed in claim 15,
said fastener threadably engaging the drive shaft,
said drive shaft and said fastener being coaxial with the common rotation axis,
said fastener and said drive shaft presenting respective oppositely directed threads, such that the drive coupler rotates in a first direction onto the drive shaft and the fastener rotates in a second opposite direction into engagement with the drive shaft.

17. The power unit as claimed in claim 15,
said second connector portion presenting a second socket configured to receive at least part of the connection shaft of the drum.

18. The power unit as claimed in claim 17,
said drive coupler including a pin associated with the second connector portion,
said pin extending traversely to the common rotation axis and being operable to drivingly engage the coupler body and the connection shaft.

19. The power unit as claimed in claim 17,
said first connector portion presenting a first socket receiving at least part of the drive shaft,
said coupler body presenting a bore that extends between the sockets so that the sockets communicate with one another.

20. The power unit as claimed in claim 19,
said fastener being rotatably received by the bore,
said fastener threadably engaging the drive shaft,
said drive shaft and said fastener being coaxial with the common rotation axis,
said fastener and said drive shaft presenting respective oppositely directed threads, such that the drive coupler rotates in a first direction onto the drive shaft and the fastener rotates in a second opposite direction into engagement with the drive shaft.

* * * * *